US012398831B2

(12) United States Patent
Kacik et al.

(10) Patent No.: US 12,398,831 B2
(45) Date of Patent: Aug. 26, 2025

(54) PIPE APPARATUS, COUPLING DEVICES, AND METHODS

(71) Applicant: Lubrizol Advanced Materials, Inc., Cleveland, OH (US)

(72) Inventors: Mark Kacik, Avon Lake, OH (US); Andrew J. Midlik, Parma, OH (US); Brian Guhde, Rocky River, OH (US); Christopher D. Zook, Akron, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 0 days.

(21) Appl. No.: 18/719,181

(22) PCT Filed: Dec. 14, 2022

(86) PCT No.: PCT/US2022/052824
§ 371 (c)(1),
(2) Date: Jun. 12, 2024

(87) PCT Pub. No.: WO2023/114286
PCT Pub. Date: Jun. 22, 2023

(65) Prior Publication Data
US 2025/0052342 A1 Feb. 13, 2025

Related U.S. Application Data

(60) Provisional application No. 63/290,773, filed on Dec. 17, 2021.

(51) Int. Cl.
*F16L 17/03* (2006.01)
*F16L 17/04* (2006.01)
*F16L 59/18* (2006.01)

(52) U.S. Cl.
CPC .............. *F16L 17/032* (2013.01); *F16L 17/04* (2013.01); *F16L 59/182* (2013.01)

(58) Field of Classification Search
CPC . F16L 17/00; F16L 17/02; F16L 17/03; F16L 21/002; F16L 21/005; F16L 21/007;
(Continued)

(56) References Cited

U.S. PATENT DOCUMENTS 1,622,768 A * 3/1927 Cook ...................... F16L 21/04
285/356
2,449,795 A 9/1948 Stillwagon
(Continued)

FOREIGN PATENT DOCUMENTS

CN 2499676 Y 7/2002
CN 100419328 9/2008
(Continued)

OTHER PUBLICATIONS

International Search Report and Written Opinion dated May 31, 2023 in International Application PCT/US2022/052824.
(Continued)

*Primary Examiner* — Aaron M Dunwoody
(74) *Attorney, Agent, or Firm* — Wentsler LLC

(57) ABSTRACT

Pipe apparatus can include a coupling device with a seal circumscribing a central axis. The seal further includes a first circumferential pocket at least partially defined by a first and second circumferential flange. A fluid guide device positioned at least partially within the first circumferential pocket includes a plurality of segments that are radially arranged to circumscribe the central axis. The fluid guide device at least partially defines a fluid path. Methods can include using the coupling device to couple a first end portion of a first pipe segment to a second end portion of a second pipe segment. Methods of using the pipe apparatus
(Continued)

can include passing fluid through the fluid path to cool the seal.

29 Claims, 14 Drawing Sheets

(58) Field of Classification Search
CPC ..... F16L 21/08; F16L 23/0283; F16L 23/036; F16L 23/16; F16L 23/162; F16L 25/12; F16L 37/08; F16L 37/04; F16L 37/084; F16L 37/0847; F16L 37/0985; F16L 58/18; F16L 58/185; F16L 58/187; F16L 59/18; F16L 59/182; F16L 59/188; F16L 31/00; F16L 33/222; F16L 53/70
See application file for complete search history.

(56) References Cited

U.S. PATENT DOCUMENTS

| | | | |
|---|---|---|---|
| 2,517,290 A * | 8/1950 | De Moude | F16L 17/00 277/612 |
| 2,980,568 A | 4/1961 | Kazmierowicz | |
| 3,268,245 A | 8/1966 | Wood | |
| 3,291,506 A | 12/1966 | Blakeley | |
| 3,695,638 A | 10/1972 | Blakeley | |
| 3,730,562 A * | 5/1973 | Viazzi | F16L 37/12 285/364 |
| 3,854,757 A * | 12/1974 | McOran-Campbell | F16L 21/025 285/369 |
| 3,861,721 A * | 1/1975 | Berghofer | F16L 21/002 285/236 |
| 3,877,733 A * | 4/1975 | Straub | F16L 21/08 285/112 |
| 4,127,287 A | 11/1978 | Davies | |
| 4,174,125 A * | 11/1979 | Wyss | F16L 17/04 285/423 |
| 4,176,274 A | 11/1979 | Lippera | |
| 4,229,028 A * | 10/1980 | Gray | F16L 21/022 285/423 |
| 4,274,662 A | 6/1981 | De Groot et al. | |
| 4,391,458 A | 7/1983 | Blakeley | |
| 4,488,738 A | 12/1984 | Valdes | |
| 4,522,434 A | 6/1985 | Webb | |
| 4,532,168 A | 7/1985 | Steele et al. | |
| 4,629,217 A * | 12/1986 | Straub | F16L 47/12 285/112 |
| 4,915,418 A | 4/1990 | Palatchy | |
| 4,984,830 A * | 1/1991 | Saunders | E21B 33/038 285/368 |
| 5,203,594 A * | 4/1993 | Straub | F16L 17/04 285/112 |
| 5,219,189 A | 6/1993 | Demoisson et al. | |
| 5,273,322 A * | 12/1993 | Straub | F16L 21/005 285/112 |
| 5,769,128 A | 6/1998 | Auvil et al. | |
| 6,312,025 B1 * | 11/2001 | Wolfsdorf | F16L 17/02 285/104 |
| 6,426,463 B2 | 7/2002 | Muenzenberger et al. | |
| 6,478,338 B1 | 11/2002 | Dalmolen et al. | |
| 7,086,131 B2 | 8/2006 | Gibb et al. | |
| 7,722,092 B2 | 5/2010 | Kim | |
| 7,874,596 B2 * | 1/2011 | Kertesz | F16L 37/0985 285/383 |
| 8,129,462 B2 | 3/2012 | Hsu et al. | |
| 8,282,136 B2 | 10/2012 | Vandal et al. | |
| 8,556,302 B2 | 10/2013 | Dole | |
| 8,777,277 B2 | 7/2014 | Dole et al. | |
| RE45,304 E | 12/2014 | Dole et al. | |
| 9,383,047 B2 | 7/2016 | Alexander et al. | |
| 9,482,374 B2 | 11/2016 | Henry | |
| 9,528,642 B2 | 12/2016 | Bancroft | |
| 9,927,052 B1 | 3/2018 | Robillard et al. | |
| 9,958,095 B2 | 5/2018 | Blease et al. | |
| 10,458,579 B2 | 10/2019 | Bowman et al. | |
| 10,578,234 B2 | 3/2020 | Bowman | |
| 10,711,929 B1 | 7/2020 | Lu et al. | |
| 10,858,795 B1 * | 12/2020 | Hsu | E03F 1/00 |
| 2006/0152005 A1 * | 7/2006 | Kertesz | F16L 37/0985 285/406 |
| 2007/0001458 A1 * | 1/2007 | Kertesz | F16L 37/0985 285/417 |
| 2010/0283236 A1 * | 11/2010 | Sudar | F16L 17/04 285/369 |
| 2015/0159789 A1 * | 6/2015 | Bachmann | F16L 21/08 285/337 |
| 2017/0009923 A1 * | 1/2017 | Chavan | F16L 37/138 |
| 2021/0285579 A1 * | 9/2021 | French | F16L 47/12 |

FOREIGN PATENT DOCUMENTS

| | | |
|---|---|---|
| CN | 209084208 U | 7/2019 |
| CN | 209495045 U | 10/2019 |
| CN | 209688325 U | 11/2019 |
| CN | 209943780 U | 1/2020 |
| CN | 210566917 U | 5/2020 |
| CN | 211371585 U | 8/2020 |
| CN | 213271427 U | 5/2021 |
| DE | 10033306 A1 | 5/2001 |
| EP | 2021676 A2 | 2/2009 |
| EP | 2644961 B1 | 11/2017 |
| EP | 3058260 B1 | 12/2017 |
| EP | 3058261 B1 | 12/2017 |
| FR | 2983555 | 6/2013 |
| GB | 796065 | 6/1958 |
| GB | 839743 | 6/1960 |
| GB | 839744 | 6/1960 |
| GB | 839745 | 6/1960 |
| GB | 1121850 | 7/1968 |
| GB | 1245265 | 9/1971 |
| IN | 201747008097 | 5/2017 |
| JP | 2019183894 | 10/2019 |
| KR | 102305130 | 9/2021 |
| RU | 2395029 | 7/2010 |
| RU | 2397394 | 8/2010 |
| WO | 2016040102 | 3/2016 |

OTHER PUBLICATIONS

Written Opinion of the International Preliminary Examining Authority dated Dec. 6, 2023 in International Application PCT/US2022/052824.

* cited by examiner

PIPE APPARATUS, COUPLING DEVICES, AND METHODS

FIELD

The present disclosure relates generally to pipe apparatus, coupling devices, and methods and, more particularly, to pipe apparatus, coupling devices and methods to provide for fluid cooled coupling devices.

BACKGROUND

In some environments, liquid delivery systems must be designed to withstand high temperature conditions while operating. For example, a fire sprinkling system is required to deliver liquid (e.g., water) to extremely hot areas in order to extinguish the fires. Such liquid delivery systems are typically fabricated from pipe segments that are joined together when installing the piping system.

It is known to provide metal coupling devices for joining metal pipe segments. Such metal coupling devices are inexpensive to install since they can be used to quickly mechanically join the pipe segments in an efficient, cost-effective manner. Furthermore, the mechanical coupling can be easily disassembled, thereby allowing subsequent replacement of a pipe segment, or other maintenance, without damaging the liquid delivery system. However, the rubber seals typically used to provide a liquid-tight connection between pipe segments may degrade and fail in a high temperature environment.

It is also known to use heat resistant polymeric pipe segments provide the liquid delivery system. For example, the polymeric pipe segments may comprise chlorinated polyvinyl chloride designed to operate during high temperature conditions. Mechanical couplings can be used to join the pipe segments. However, the polymeric pipe segments may soften too much to maintain the proper mechanical connection between pipe segments. The pipe segments can be permanently attached to one another, for example, with hot air welding, fusion welding, or a solvent cement process. However, such joining techniques are labor intensive and therefore an expensive option for joining the pipe segments. Furthermore, such joining techniques permanently join the pipe segments; therefore complicating subsequent maintenance or disassembly without damaging the liquid delivery system.

There is a desire for coupling devices that allows removable and fast coupling of segments while withstanding a high temperature operating environment.

SUMMARY

Aspects of the disclosure provide a pipe apparatus with pipe segments that can be quickly coupled and decoupled from one another with a mechanical coupling device. The mechanical coupling device is designed to allow the seal to survive high temperature operating conditions while coupling pipe segments comprising metal or other heat-resistant materials. The mechanical coupling device can comprise features that encourage a portion of liquid flowing through the pipe segments to travel within a fluid path that cools the seal in use. The fluid-cooled seal and/or other features of the disclosure help permit use of high-temperature resistant pipe segments (e.g., metal pipe segments) that can maintain structural integrity of the joint between the pipe segments while also allowing the seal to be maintained at an acceptable temperature in a high temperature environment that would otherwise damage the seal and cause failure of the fluid tight seal at the joint between the pipe segments.

Some example embodiments of the disclosure are described below with the understanding that any of the embodiments may be used alone or in combination with one another.

Embodiment 1. A pipe apparatus comprises a first pipe segment comprising a first end portion comprising a first outer circumferential edge and a second pipe segment comprising a second end portion comprising a second outer circumferential edge facing the first outer circumferential edge. The first outer circumferential edge is spaced from the second outer circumferential edge to define a circumferential gap between the first outer circumferential edge and the second outer circumferential edge. A seal circumscribes the circumferential gap. The seal comprises a first circumferential flange engaging the first end portion of the first pipe segment and a second circumferential flange engaging the second end portion of the second pipe segment. The pipe apparatus further comprises a first circumferential pocket defined between an interior surface of the seal, the first end portion, and the second end portion. A fluid guide device is positioned at least partially within the first circumferential pocket. The fluid guide device comprises a plurality of segments that are radially arranged to circumscribe the first end portion and the second end portion. The fluid guide device further comprises a first axial end positioned over the first end portion and a second axial end positioned over the second end portion. The fluid guide device at least partially defines a fluid path extending from the circumferential gap through an area defined between the fluid guide device and the interior surface of the seal.

Embodiment 2. The pipe apparatus of embodiment 1, wherein the fluid guide device comprises a circumferential guide flange extending at least partially into the circumferential gap between the first outer circumferential edge and the second outer circumferential edge. An axial width of the circumferential guide flange is less than an axial width of the circumferential gap.

Embodiment 3. The pipe apparatus of embodiment 2, wherein the circumferential guide flange is spaced from the first outer circumferential edge and the second outer circumferential edge.

Embodiment 4. The pipe apparatus of any one of embodiments 1-3, further comprising a first tongue and groove connection axially locking the fluid guide device to the first end portion and a second tongue and groove connection axially locking the fluid guide device to the second end portion.

Embodiment 5. The pipe apparatus of any one of embodiments 1-4, further comprising a third tongue and groove connection axially locking the seal to the fluid guide device.

Embodiment 6. The pipe apparatus of any one of embodiments 1-5, wherein an outer surface of the fluid guide device further comprises at least one blind channel extending from the first axial end to the second axial end, wherein the area comprises the blind channel.

Embodiment 7. The pipe apparatus of any one of embodiments 1-6, wherein the fluid guide device further comprises at least one first through channel extending from the first axial end toward the second axial end, wherein an axial length of the first through channel is less than an axial length of the fluid guide device.

Embodiment 8. The pipe apparatus of embodiment 7, wherein the axial length of the first through channel is less than or equal to half the axial length of the fluid guide device.

Embodiment 9. The pipe apparatus of any one of embodiments 7-8, wherein the fluid guide device further comprises at least one second through channel extending from the second axial end toward the first axial end, wherein an axial length of the second through channel is less than the axial length of the fluid guide device.

Embodiment 10. The pipe apparatus of embodiment 9, wherein the axial length of the second through channel is less than or equal to half the axial length of the fluid guide device.

Embodiment 11. The pipe apparatus of any one of embodiments 1-10, further comprising a housing comprising a second circumferential pocket, wherein the seal is positioned within the second circumferential pocket.

Embodiment 12. The pipe apparatus of embodiment 11, further comprising a heat shield at least partially circumscribing the housing, the heat shield spaced from the housing to define a chamber between the heat shield and the housing.

Embodiment 13. A method of using the pipe apparatus of embodiment 1 comprising passing an upstream quantity of fluid through an interior of the first pipe segment in a first axial direction of the first pipe segment. The method further comprises passing a first portion of the first upstream quantity of fluid through an interior of the second pipe segment in a second axial direction of the second pipe segment. The method further comprises cooling the seal by passing a second portion of the first upstream quantity of fluid through the area; and then passing the second portion of the first upstream quantity of fluid through the interior of the second pipe segment.

Embodiment 14. The method of embodiment 13, further comprising driving the second portion of the first upstream quantity of fluid through the area with a pressure drop.

Embodiment 15. A pipe apparatus comprises a first pipe segment comprising a first end portion comprising a first outer circumferential edge. The pipe apparatus further comprises a second pipe segment. The second pipe segment comprises a second end portion comprising a second outer circumferential edge facing the first outer circumferential edge. The first outer circumferential edge is spaced from the second outer circumferential edge to define a circumferential gap between the first outer circumferential edge and the second outer circumferential edge. A seal circumscribes the circumferential gap. The seal comprises a first circumferential flange engaging the first end portion of the first pipe segment and a second circumferential flange engaging the second end portion of the second pipe segment. The pipe apparatus further comprises a first circumferential pocket defined between an interior surface of the seal, the first end portion, and the second end portion. The pipe apparatus still further comprises a fluid guide device positioned at least partially within the first circumferential pocket. The fluid guide device comprises a circumferential guide flange extending at least partially into the circumferential gap between the first outer circumferential edge and the second outer circumferential edge. An axial width of the circumferential guide flange is less than an axial width of the circumferential gap. The circumferential guide flange is spaced from the first outer circumferential edge to define a fluid inlet port, and the circumferential guide flange is spaced from the second outer circumferential edge to define a fluid outlet port. The fluid guide device at least partially defines a fluid path extending from the fluid inlet port through an area defined between the fluid guide device and the interior surface of the seal, and from the area to the fluid outlet port.

Embodiment 16. A method of using the pipe apparatus of embodiment 15 comprises passing an upstream quantity of fluid through an interior of the first pipe segment in a first axial direction of the first pipe segment. The method further comprises passing a first portion of the first upstream quantity of fluid through an interior of the second pipe segment in a second axial direction of the second pipe segment. The method still further comprises passing a second portion of the first upstream quantity of fluid through the fluid inlet port, then through the area to cool the seal, and then through the fluid outlet port; and then passing the second portion of the first upstream quantity of fluid through the interior of the second pipe segment.

Embodiment 17. The method of embodiment 16, wherein the area comprises at least one blind channel of an outer surface of the fluid guide device and the passing the second portion of the first upstream quantity of fluid through the area comprises passing the second portion of the first upstream quantity of fluid through the blind channel from a first axial end of the fluid guide device to a second axial end of the fluid guide device.

Embodiment 18. The method of embodiment 17, wherein after the second portion of the first upstream quantity of fluid passes through the fluid inlet port and prior to passing through the blind channel, the second portion of the first upstream quantity of fluid then passes through at least one first through channel of the fluid guide device extending from the first axial end toward the second axial end. A length of the first through channel is less than an axial length of the fluid guide device.

Embodiment 19. The method of any one of embodiments 16-18, further comprising driving the second portion of the first upstream quantity of fluid through the area with a pressure drop between the fluid inlet port and the fluid outlet port.

Embodiment 20. A coupling device comprises a seal circumscribing a central axis of the coupling device. The seal comprises a first circumferential flange extending toward the central axis and a second circumferential flange extending toward the central axis. The seal further comprises a first circumferential pocket at least partially defined by an interior surface of the seal, the first circumferential flange, and the second circumferential flange. The coupling device further comprises a fluid guide device positioned at least partially within the first circumferential pocket. The fluid guide device comprises a plurality of segments that are radially arranged to circumscribe the central axis. The fluid guide device at least partially defines a fluid path extending through an area defined between the fluid guide device and the interior surface of the seal.

Embodiment 21. The coupling device of embodiment 20, wherein the seal biases the plurality of segments together in a constricted configuration.

Embodiment 22. The coupling device of any one of embodiments 20-21, wherein the fluid guide device comprises a circumferential guide flange extending toward the central axis and circumscribing the central axis.

Embodiment 23. The coupling device of any one of embodiments 20-22, further comprising a tongue and groove connection axially locking the seal to the fluid guide device.

Embodiment 24. The coupling device of any one of embodiments 20-23, wherein an outer surface of the fluid guide device further comprises at least one blind channel extending from a first axial end of the fluid guide device to a second axial end of the fluid guide device, wherein the area comprises the blind channel.

Embodiment 25. The coupling device of any one of embodiments 20-23, wherein the fluid guide device further comprises at least one first through channel extending from a first axial end of the fluid guide device toward a second axial end of the fluid guide device. An axial length of the first through channel is less than an axial length of the fluid guide device.

Embodiment 26. The coupling device of embodiment 25, wherein the axial length of the first through channel is less than or equal to half the axial length of the fluid guide device.

Embodiment 27. The coupling device of any one of embodiments 25-26, wherein the fluid guide device further comprises at least one second through channel extending from the second axial end toward the first axial end, wherein an axial length of the second through channel is less than the axial length of the fluid guide device.

Embodiment 28. The coupling device of embodiment 27, wherein the axial length of the second through channel is less than or equal to half the axial length of the fluid guide device.

Embodiment 29. The coupling device of any one of embodiments 25-28, wherein an outer surface of the fluid guide device further comprises at least one blind channel extending from the first axial end to the second axial end, wherein the area comprises the blind channel.

Embodiment 30. A method of assembling a pipe apparatus comprising the coupling device of claim 20 comprises inserting a first outer circumferential edge of a first end portion of a first pipe segment into a first axial opening of the seal. The first circumferential flange seals against an outer peripheral surface of the first end portion. The method further comprises axially locking the first end portion of the first pipe segment to the fluid guide device. The method further comprises inserting a second outer circumferential edge of a second end portion of a second pipe segment into a second axial opening of the seal. The second circumferential flange seals against an outer peripheral surface of the second end portion. The method still further comprises axially locking the second end portion of the second pipe segment to the fluid guide device. The first outer circumferential edge faces the second outer circumferential edge and a gap is maintained between the first outer circumferential edge and the second outer circumferential edge.

Embodiment 31. The method of embodiment 30, wherein a circumferential guide flange of the fluid guide device extends into the gap.

Embodiment 32. The method of embodiment 31, wherein the circumferential guide flange is spaced from the first outer circumferential edge and the second outer circumferential edge.

Embodiment 33. The method of any one of embodiments 30-32, wherein the axially locking the first end portion of the first pipe segment to the fluid guide device comprises engaging a tongue of one of the first end portion or the fluid guide device with a groove of another of the first end portion or the fluid guide device.

Embodiment 34. The method of embodiment 33, wherein the axially locking the second end portion of the first pipe segment to the fluid guide device comprises engaging a tongue of one of the second end portion or the fluid guide device with a groove of another of the first end portion or the fluid guide device.

Embodiment 35. The method of any one of embodiments 30-34, wherein the inserting the first outer circumferential edge of the first end portion of the first pipe segment into the first axial opening of the seal dilates a first corresponding axial end of the plurality of segments of the fluid guide device against a bias of the seal.

Embodiment 36. The method of embodiment 35, wherein the axially locking the first end portion to the fluid guide device comprises constricting the first corresponding axial end of the plurality of segments of the fluid guide device.

Embodiment 37. The method of any one of embodiments 30-36, wherein the inserting the second outer circumferential edge of the second end portion of the second pipe segment into the second axial opening of the seal dilates a corresponding second axial end of the plurality of segments of the fluid guide device against a bias of the seal.

Embodiment 38. The method of embodiment 37, wherein the axially locking the second end portion to the fluid guide device comprises constricting the corresponding second axial end of the plurality of segments of the fluid guide device.

BRIEF DESCRIPTION OF THE DRAWINGS

These and other embodiments are better understood when the following detailed description is read with reference to the accompanying drawings, in which.

DETAILED DESCRIPTION

Figure 1:
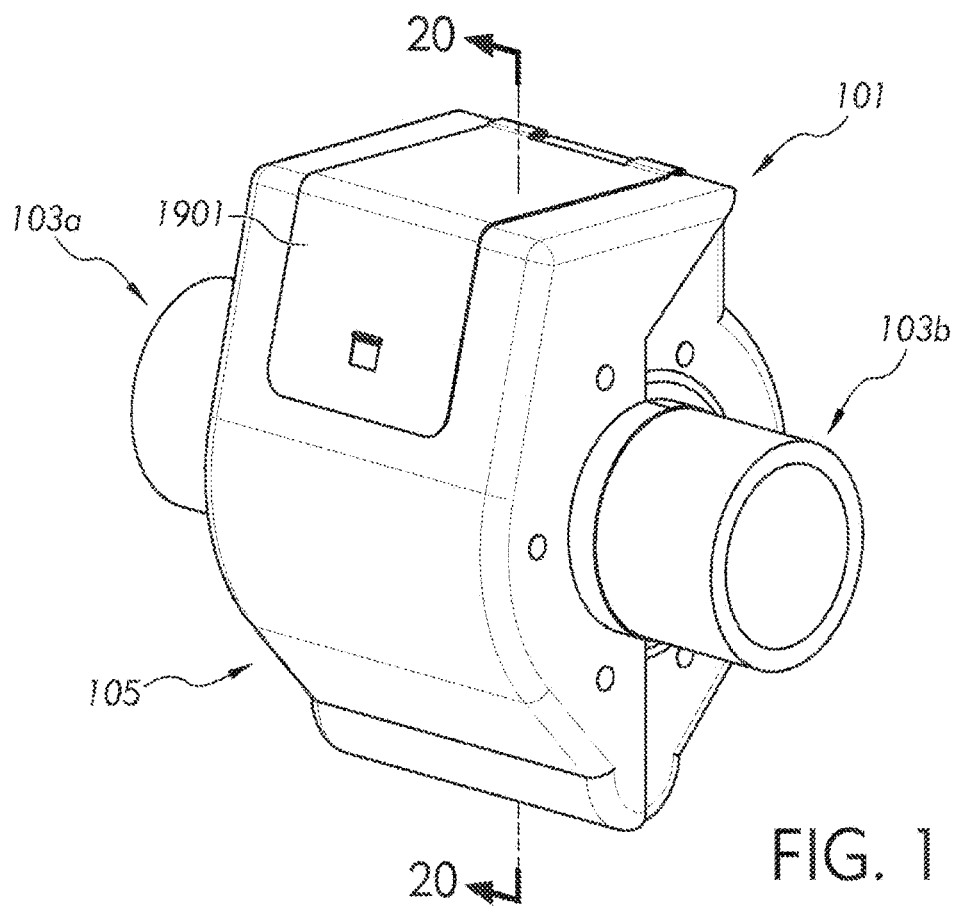
FIG. 1 illustrates an upper perspective view of a pipe apparatus in accordance with aspects of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Figure 2:
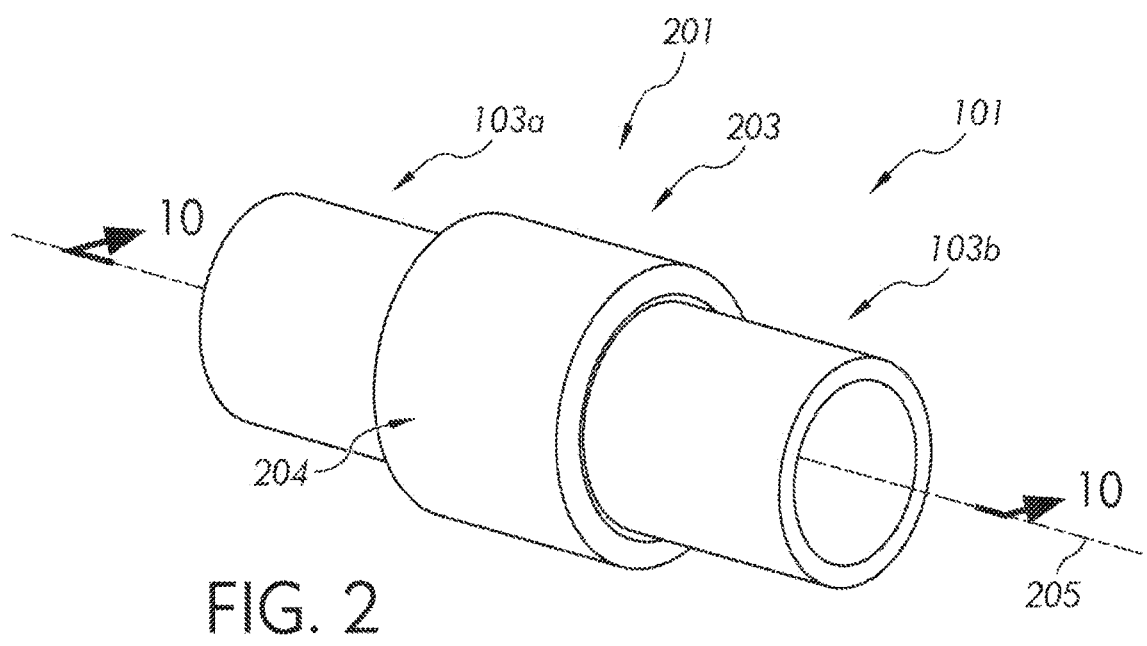
FIG. 2 illustrates a further upper perspective view of a pipe apparatus in accordance with aspects of the disclosure.

FIG. 1 illustrates embodiments of a pipe apparatus 101 comprising a first pipe segment 103a and a second pipe segment 103b and an insulating device 105 described more fully below. FIG. 2 shows the pipe apparatus 101 without the insulating device 105 for clarity and also demonstrates embodiments of the pipe apparatus 101 that do not include the insulating device 105. As shown in FIG. 2, the pipe apparatus 101 can further comprise a coupling device 201 including a seal 203 circumscribing a central axis 205 of the coupling device 201 and end portions of the pipe segments 103a, 103b. In some embodiments, the pipe apparatus 101 can be considered the coupling device 201 alone or in combination with the portions of the pipe segments 103a, 103b.

Figure 7:
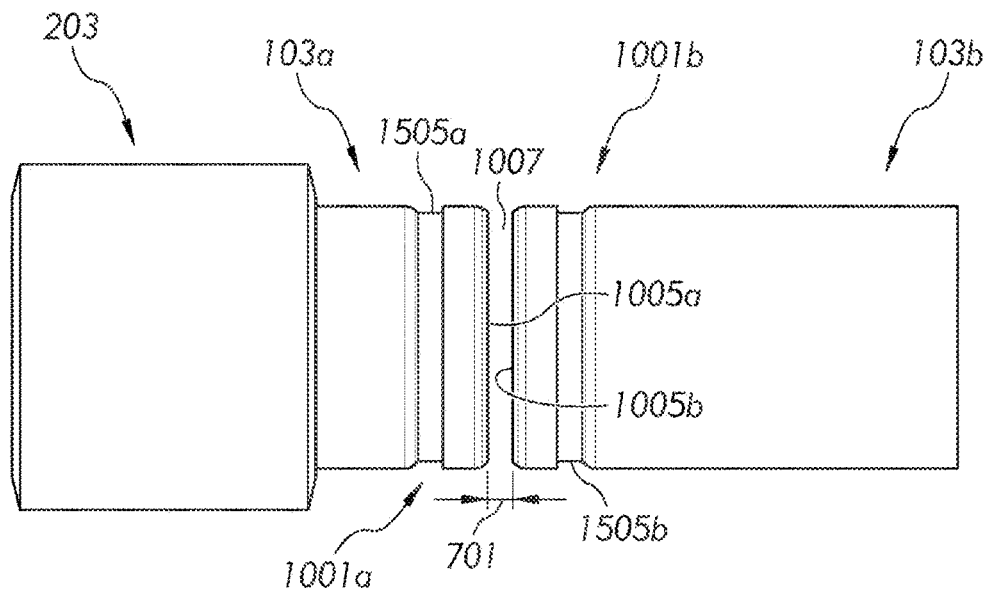
FIGS. 7-8 illustrates steps in a first method of assembling the pipe apparatus of FIG. 2.
Figure 10:
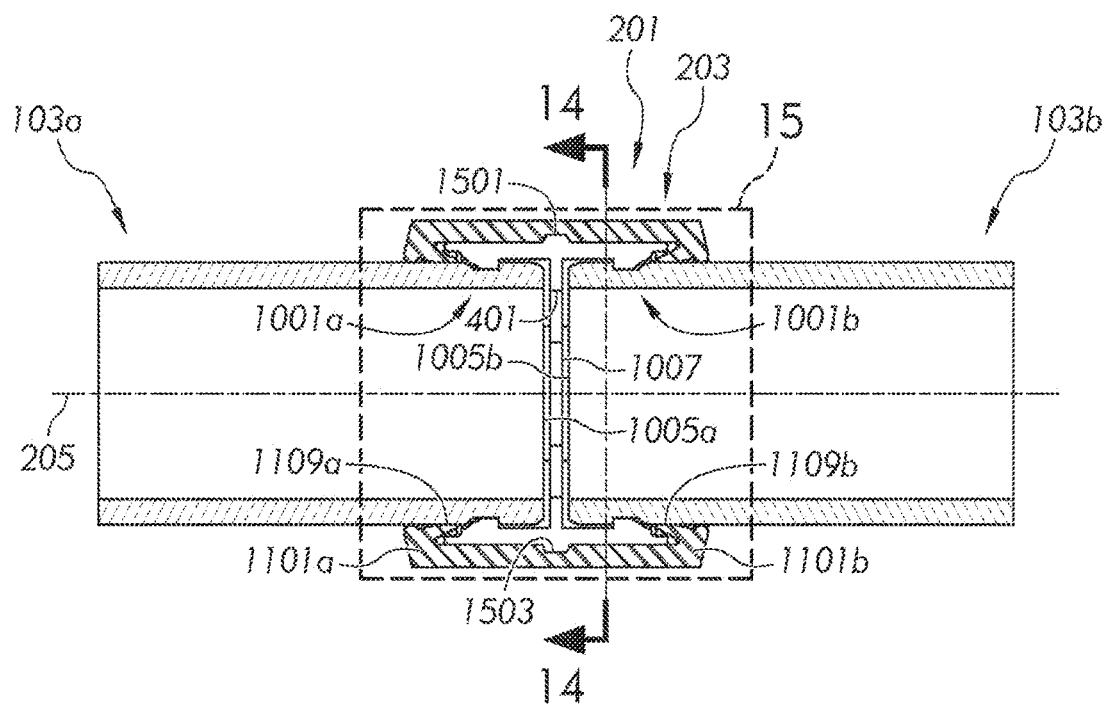
FIG. 10 is a cross-section of the pipe apparatus along line 10-10 of FIG. 2.

FIG. 10 is a cross section of FIG. 2 and shows the first pipe segment 103a comprising a first end portion 1001a and the second pipe segment 103b comprising a second end portion 1001b. As shown in FIGS. 7 and 10, the first end portion 1001a of the first pipe segment 103a comprises a first outer circumferential edge 1005a and the second end portion 1001b of the second pipe segment 103b comprises a second outer circumferential edge 1005b. The outer circumferential edges 1005a, 1005b can comprise blunted edges that are rounded, tapered or flat. For example, both outer circumferential edges 1005a, 1005b can comprise substantially flat surfaces (e.g., see 1005a in FIG. 3). As shown in FIG. 7, the second outer circumferential edge 1005b can face the first outer circumferential edge 1005a. Furthermore, the first outer circumferential edge 1005a can be spaced from the second outer circumferential edge 1005b to define a circumferential gap 1007 between the first outer circumferential edge 1005a and the second outer circumferential edge 1005b. As shown in FIG. 7, the circumferential gap 1007 can comprise a gap width 701. In some embodiments, the gap width 701 can be substantially constant about the pipe circumference with the outer circumferential edges 1005a, 1005b extending parallel with one another. Providing the outer circumferential edges 1005a, 1005b as substantially flat and parallel edges can allow the gap width 701 to be substantially constant across at least a portion of the thickness of the pipe wall and radially about the central axis 205. Providing a substantially constant gap width 701 can allow uniform fluid flow through the gap width 701 when cooling the seal 203.

As shown, the pipe segments 103a, 103b can comprise circular cylindrical pipe segments although the pipe segments can comprise elliptical, polygonal, or other shaped cylindrical pipe segments in further embodiments. Furthermore, only a small portion of the pipe segments 103a, 103b are illustrated for clarity. In some embodiments, one or both of the pipe segments can comprise a substantially straight segment traveling from one junction to the next junction. In further embodiments, one or both of pipe segments may comprise a portion of a fitting such as a tee, elbow, cross, reducer, cap, valve, adaptor, or other type of fitting. The pipe segments 103a, 103b can comprise a wide range of materials that can maintain structural integrity under temperatures up to 850° C. such as metal (e.g., steel, brass) or temperatures up to 150° C. (e.g., chlorinated polyvinyl chloride).

Figure 11:
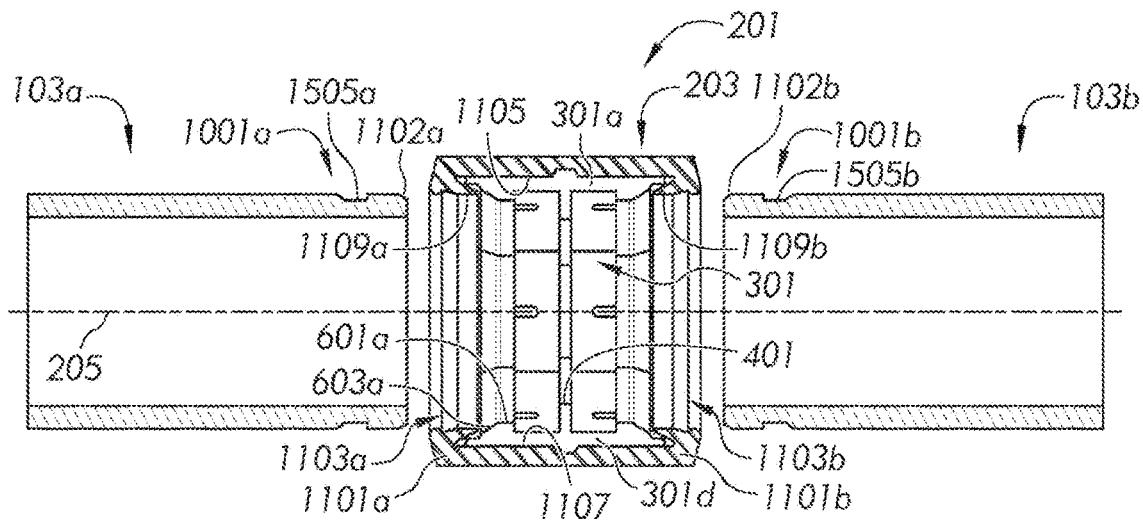
FIGS. 11-13 illustrate steps in a second method of assembling the pipe apparatus of FIG. 2.

Referring to FIGS. 10-11, the coupling device 201 can comprise the seal 203 circumscribing the central axis 205 of the coupling device 201. The seal 203 can comprise a first circumferential flange 1101a and a second circumferential flange 1101b that each extend toward the central axis 205 and circumscribe the central axis 205. As shown in FIG. 11, the first circumferential flange 1101a and the second circumferential flange 1101b can define a first axial opening 1103a into the coupling device 201 and a second axial opening 1103b into the coupling device 201, respectively. The seal 203 can further comprise a first circumferential pocket 1105 at least partially defined by the first circumferential flange 1101a and the second circumferential flange 1101b. For example, the first circumferential pocket 1105 can be at least partially defined by an interior concave surface 1107 of the seal 203, a first circumferential lip 1109a of the first circumferential flange 1101a that extends toward the second axial opening 1103b of the seal 203 and a second circumferential lip 1109b of the second circumferential flange 1101b that extends toward the first axial opening 1103a of the seal 203. The seal 203 can comprise a wide range of materials. For example, the seal 203 can comprise a flexible elastomeric material that can conform to the shape of the outer surface of the pipe segments for a fluid tight fit. In some embodiments, the seal 203 can comprise EPDM rubber although other types of materials may be provided in further embodiments.

Figure 3:
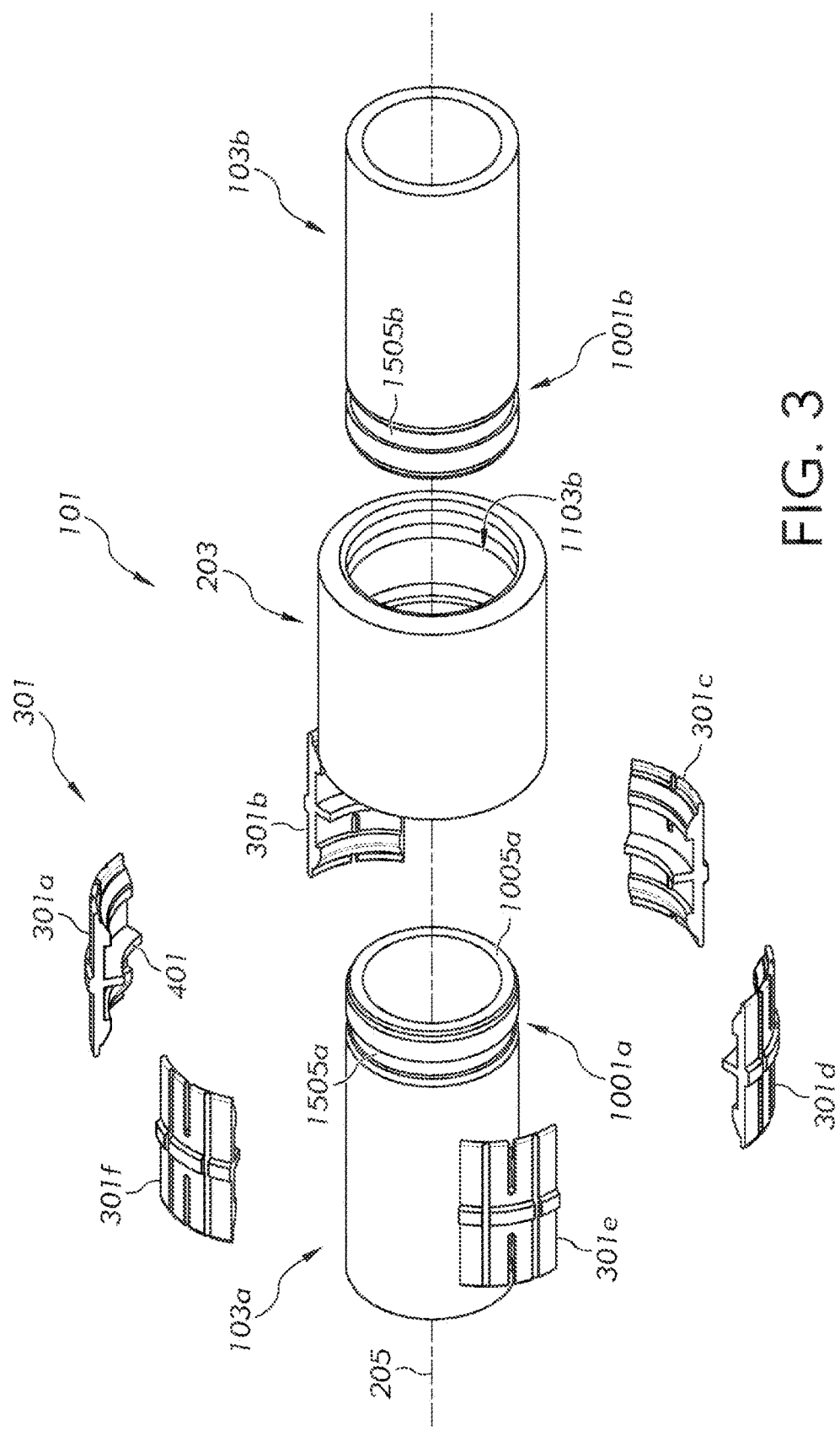
FIG. 3 illustrates an exploded view of the pipe apparatus of FIG. 2.
Figure 14:
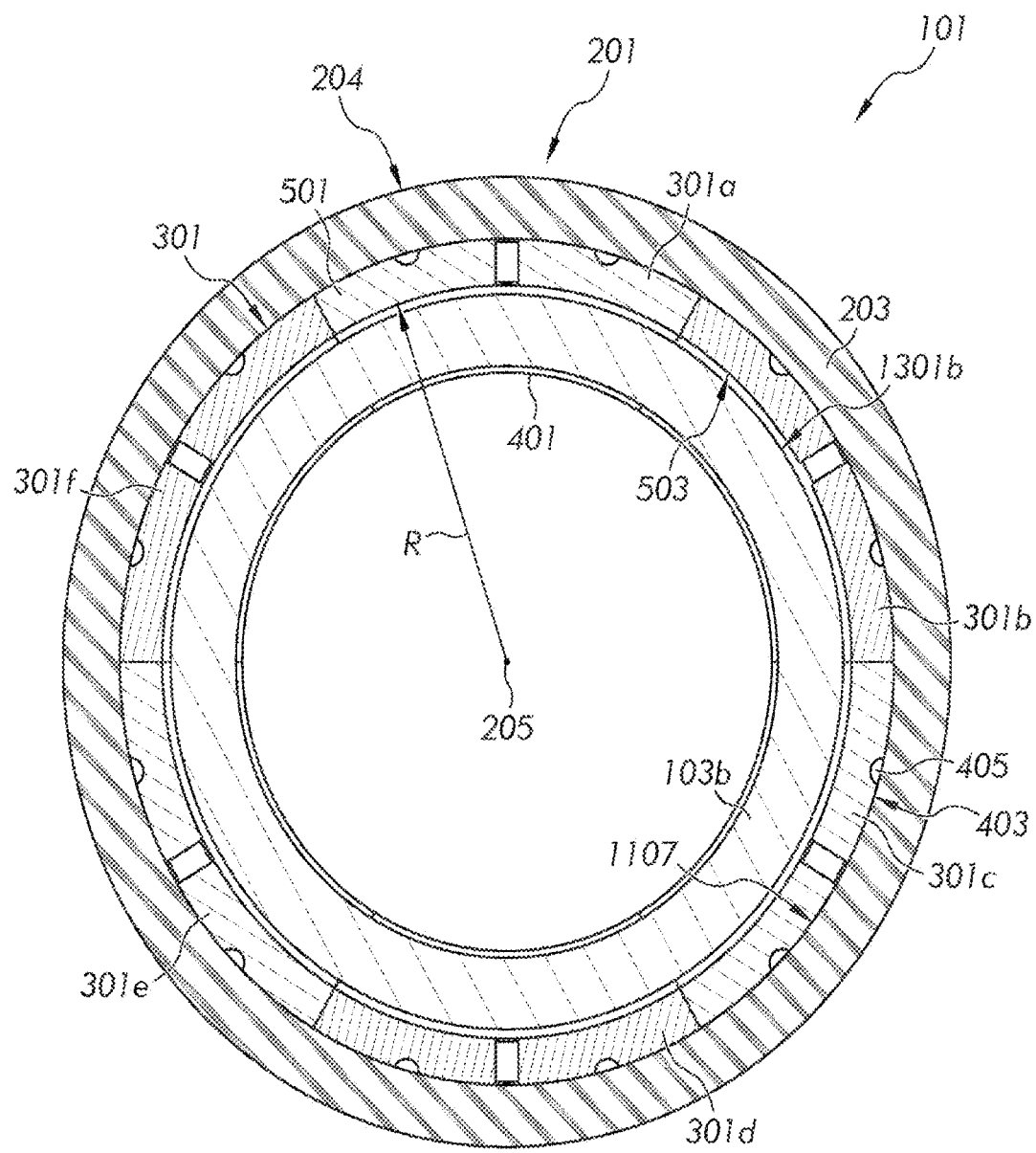
FIG. 14 is a cross-section of the pipe apparatus along line 14-14 of FIG. 10.

As shown in FIG. 3, the coupling device 201 can further comprise a fluid guide device 301. As shown in FIGS. 3 and 14, the fluid guide device can comprise a plurality of segments 301a-f that are radially arranged to circumscribe the central axis 205. The illustrated plurality of segments 301a-f comprises six segments that are radially arranged about the central axis 205 with the understanding that any number of two or more segments can be provided that are less than or greater than the illustrated six segments. In some embodiments, as shown, each segment of the plurality of segments 301a-f can be identical to one another although different configurations may be provided in further embodiments.

Figure 4:
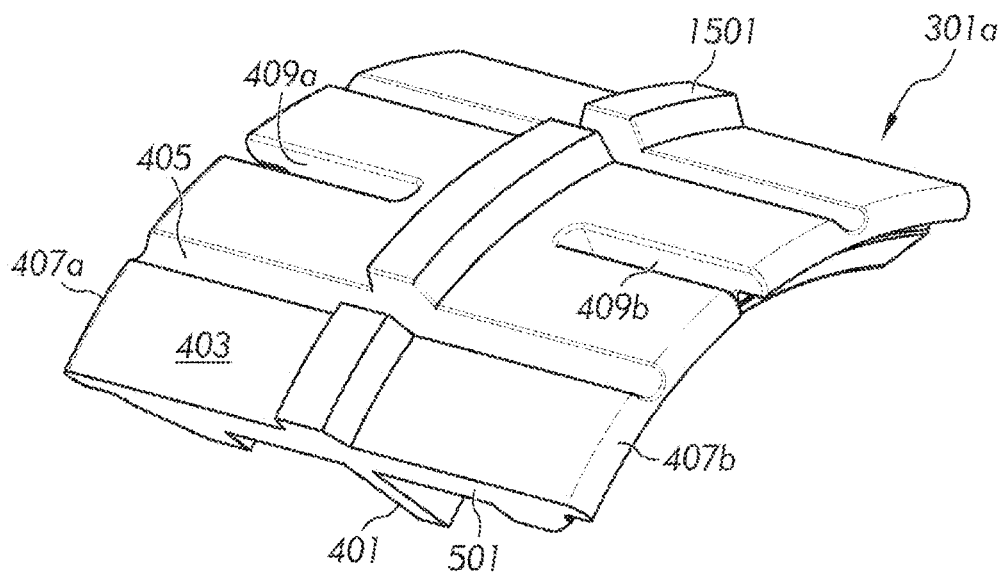
FIG. 4 illustrates an upper perspective view of a segment of a fluid guide device illustrated in FIG. 3.
Figure 5:
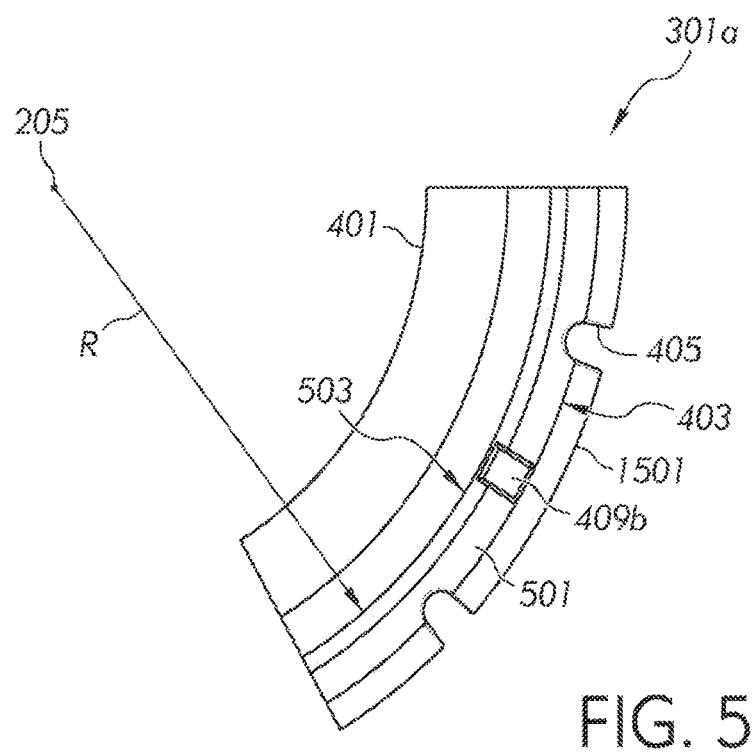
FIG. 5 illustrates a side view of the segment of the fluid guide device of FIG. 4.
Figure 6:
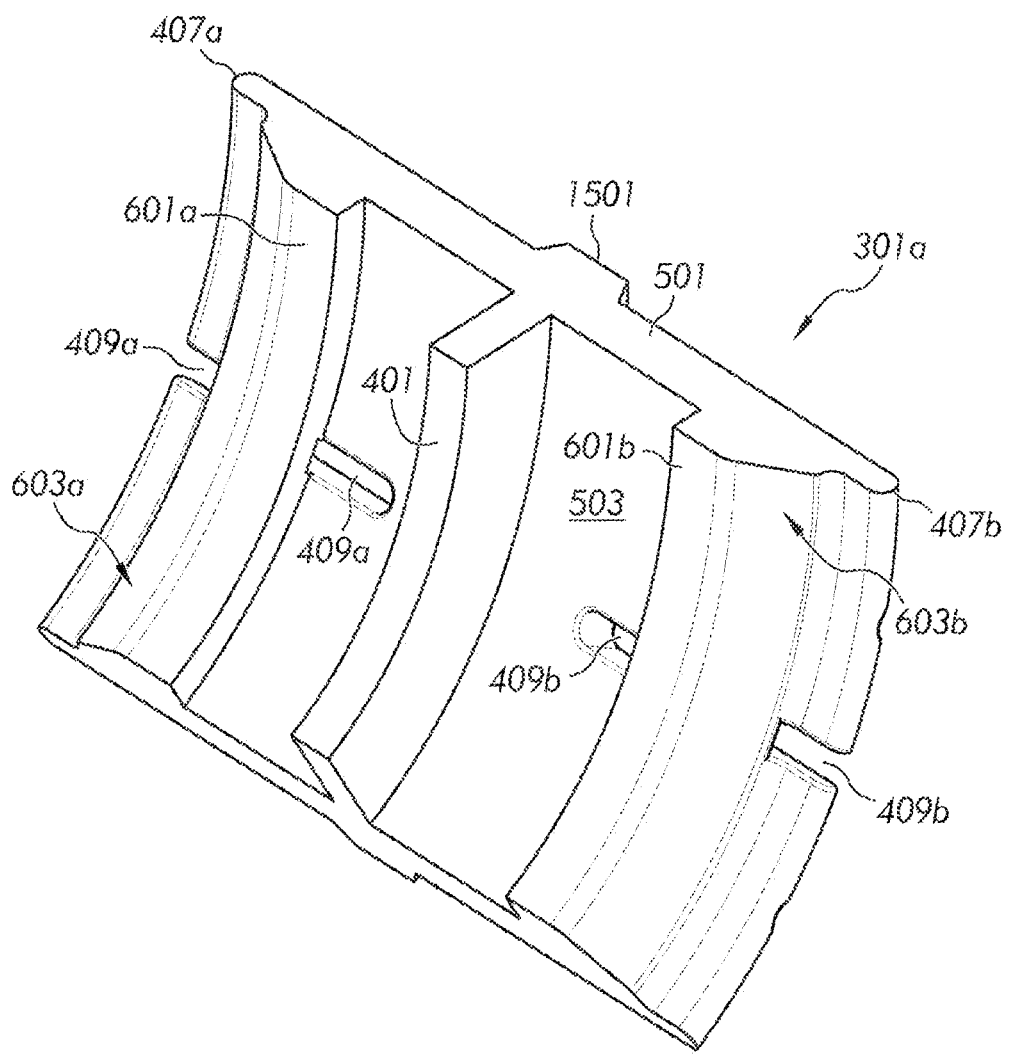
FIG. 6 illustrates a lower perspective view of the segment of the fluid guide device illustrated in FIG. 4.
Figure 15:
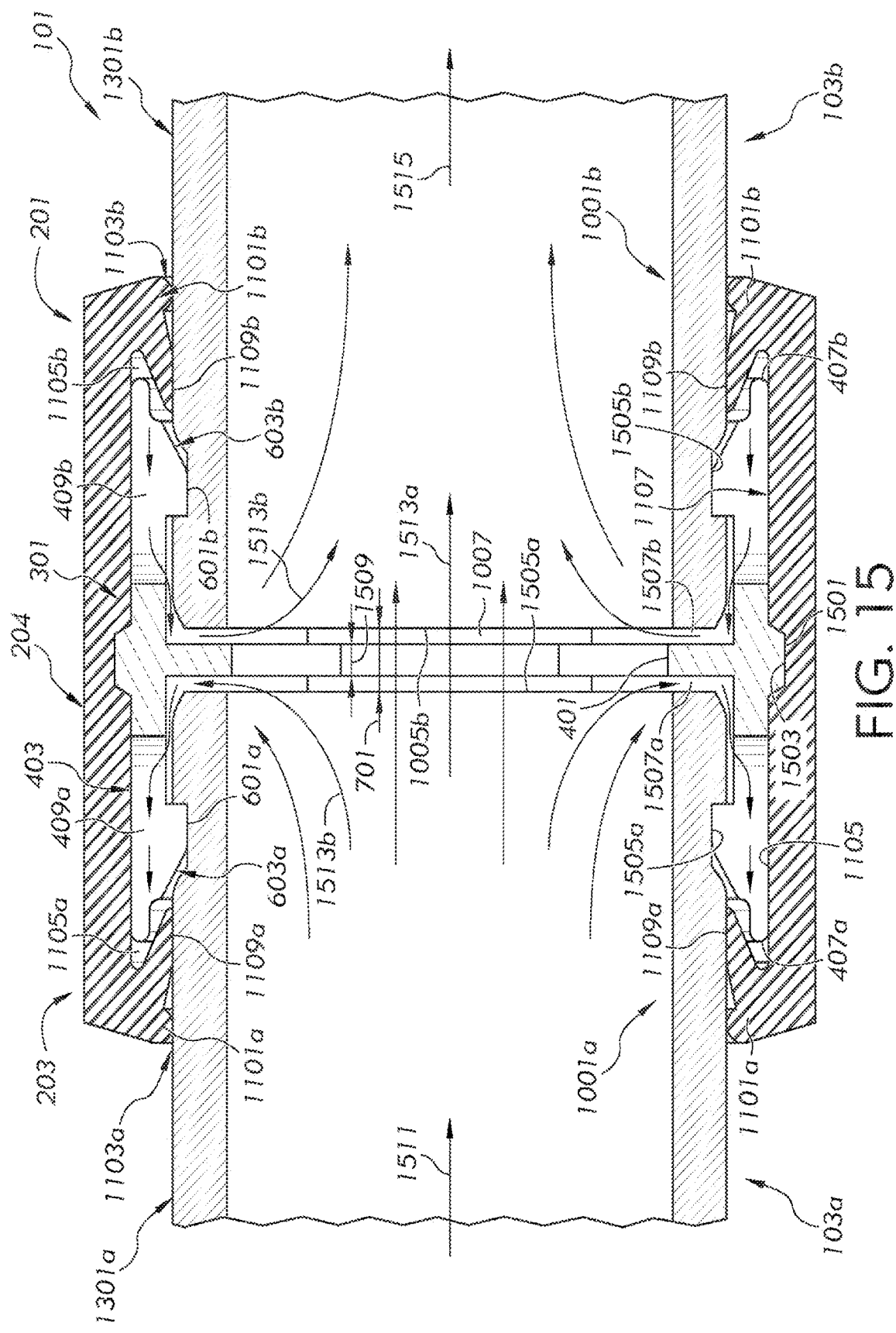
FIG. 15 is an enlarged view of FIG. 10, taken at view 15 of FIG. 10 but with the section taken through the through channels of the segments of the fluid guide device, wherein the pipe apparatus is being used to cool the seal.

A first segment 301a of the plurality of segments 301a-f is illustrated in FIGS. 4-6 with the understanding that the description of the first segment 301a can apply to the other segments 301b-f that can each be identical to the first segment 301a. As shown in FIGS. 4-6, the segments can each comprise an arcuate wall 501 with an inner concave surface 503 that can extend with a substantially constant radius "R" from the central axis 205 when installed as shown in FIG. 14. The segments further comprise a segment axis that is coincident with the central axis 205 when installed as shown in FIG. 14. As shown in FIGS. 14-15, a portion of inner concave surface 503 with the substantially constant radius "R" can extend closely along an outer peripheral surface 1301b of the second end portion 1001b of the second pipe segment 103b and another portion of the inner concave surface 503 with the substantially constant radius "R" can extend closely along an outer peripheral surface 1301a of the first end portion 1001a of the first pipe segment 103a.

As shown in FIGS. 4-6, the guide segments can each comprise a circumferential guide flange 401. As shown in FIGS. 3 and 14, each circumferential guide flange 401 of each of the plurality of segments 301a-f can extend toward the central axis 205 and cooperated to circumscribe the central axis 205. As further illustrated, an outer convex surface 403 of the fluid guide device 301 can comprise at least one blind channel 405. As shown in FIGS. 4-5, the outer convex surface 403 can face opposite the inner concave surface 503 of the arcuate wall 501. In some embodiments, the outer convex surface 403 can be geometrically similar to the inner concave surface 503 such that at least a portion of the arcuate wall 501 can comprise a continuous wall thickness between the outer convex surface 403 and the inner concave surface 503.

Figure 16:
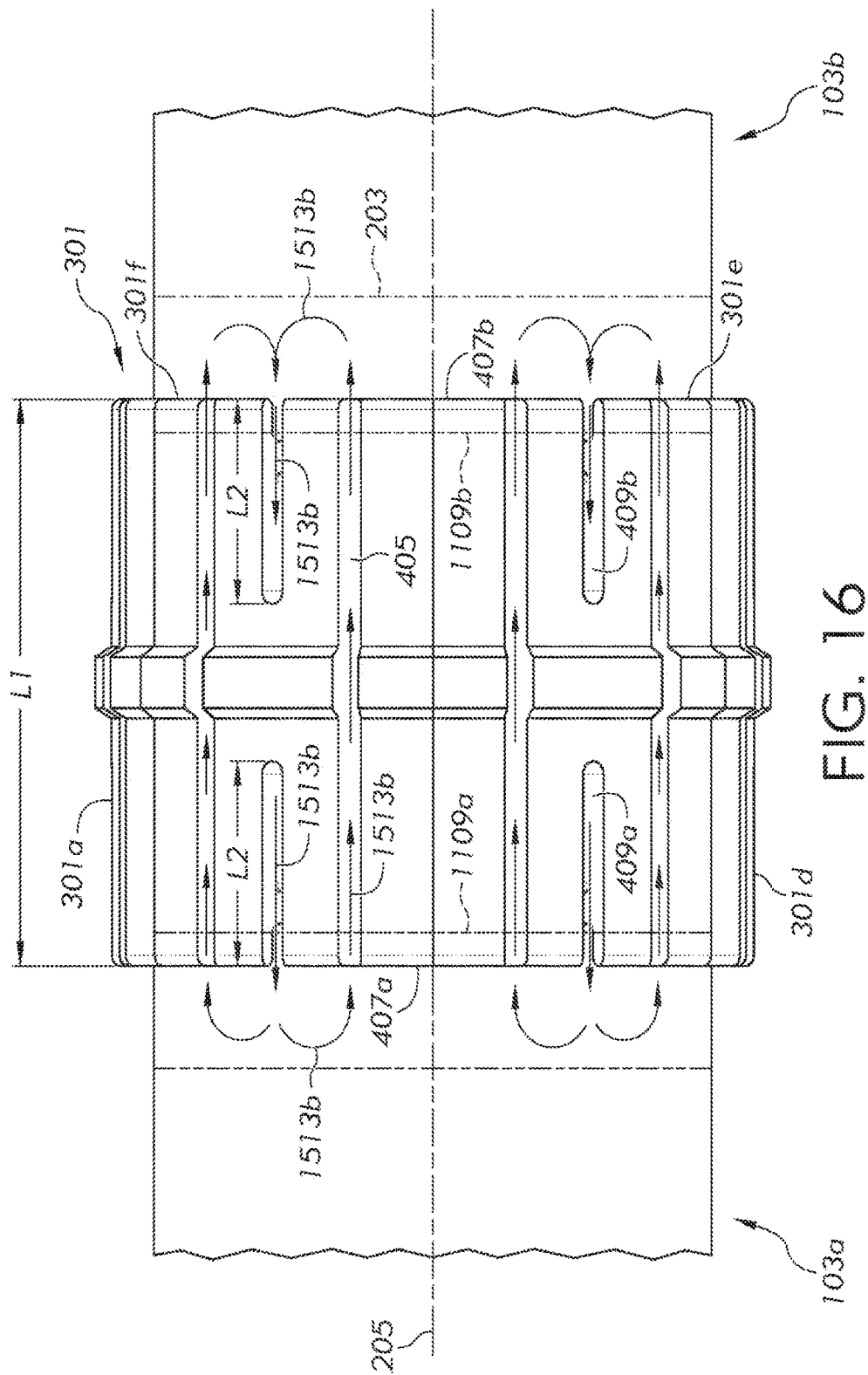
FIG. 16 is an enlarged view of FIG. 8, taken at view 16 of FIG. 8, that illustrates the pipe apparatus being used to cool the seal, wherein the seal in the position shown in FIG. 15 is illustrated schematically with broken lines for clarity.

The fluid guide device 301 can comprise at least one blind channel. For example, as shown in FIGS. 4-5, the outer convex surface 403 of the arcuate wall 501 of the first segment 301a can comprise at least one blind channel 405 extending along the segment axis from a first axial end 407a of the first segment 301a of the fluid guide device 301 to a second axial end 407b of the first segment 301a of the fluid guide device 301. Although two blind channels 405 are illustrated per segment, in further embodiments one or more than two blind channels may be provided per segment in further embodiments. For purposes of this disclosure, a blind channel of the outer convex surface 403 of the arcuate wall 501 means a channel that does not extend through the entire thickness of the arcuate wall 501 between the inner concave surface 503 and the outer convex surface 403 of the arcuate wall 501. In some embodiments, as shown in FIG. 16, the blind channels 405 can comprise linear blind channels that extend parallel relative to the central axis 205. In further embodiments, although not shown, serpentine blind channels 405 in the shape of a sine wave or other non-linear and/or linear blind channel patterns can be incorporated in further embodiments. Providing the illustrated single pass linear blind channels can reduce flow resistance that can increase convective heat transfer from the seal 203 in some embodiments due to an increased flow rate of the fluid traveling in the blind channels. Providing serpentine or other non-linear and/or linear blind channel patterns can increase the length of time the fluid is in contact with the seal, thereby giving the fluid more time to conduct heat from the seal resulting in greater heat transfer per volume of fluid traveling through the blind channel as described more fully below.

The fluid guide device 301 can further comprise at least one through channel extending from one axial end of the fluid guide device 301 toward the other axial end of the fluid guide device 301. For purposes of this disclosure, a through channel means a channel that extends through the entire thickness of the arcuate wall 501 between the inner concave surface 503 and the outer convex surface 403 of the arcuate wall 501. For example, as shown in FIGS. 4-6, the first segment 301a can comprise a first through channel 409a extending from the first axial end 407a of the first segment 301a toward the second axial end 407b of the first segment 301a. As further shown in FIGS. 4-6, the first segment 301a can comprise a second through channel 409b extending from the second axial end 407b of the first segment 301a toward the first axial end 407a of the first segment 301a. As shown in FIG. 16, the axial length "L2" of the first through channel 409a and/or the axial length "L2" of the second through channel 409b can be less than the axial length "L1" of the fluid guide device 301, such as less than or equal to half the axial length "L1" of the fluid guide device. As shown, the through channels 409a, 409b can comprise linear through channels that run parallel relative to the central axis 205 although other nonlinear shapes or patterns may be provided in further embodiments. Furthermore, as shown, each segment 301a-f includes a single first through channel 409a and a single second through channel 409b. Although not shown, in further embodiments, the at least one first through channel can comprise a plurality of first through channels and/or the at least one second through channel can comprise a plurality of second through channels.

As shown in FIG. 11, the fluid guide device 301 can be mounted within the seal 203. For example, as shown in FIG. 11, the plurality of segments 301a-f can be positioned at least partially within the first circumferential pocket 1105. In some embodiments, the pipe apparatus 101 can be considered as the coupling device 201 without the pipe segments 103a, 103b. Indeed, as shown in FIG. 11, the coupling device 201 can be assembled without the pipe segments 103a, 103b wherein the coupling device (comprising the segments 301a-f mounted within the seal 203) can be sold separately or otherwise provided for subsequent coupling with pipe segments. The seal 203 can include features that help secure the pipe segments 103a, 103b in place even when not connected to the pipe segments. For example, as shown in FIG. 15, once the plurality of segments 301a-f are positioned at least partially within the first circumferential pocket 1105, the first axial end 407a of each of the segments 301a-f can be positioned within a first inwardly facing end pocket defined between the first circumferential lip 1109a and the interior concave surface 1107. Likewise, the second axial end 407b of each of the segments 301a-f can be positioned within a second inwardly facing end pocket defined between the second circumferential lip 1109b and the interior concave surface 1107. Once placed, each of the segments 301a-f are trapped in the illustrated seated position within the first circumferential pocket 1105 by way of the first and second inwardly facing end pockets. Furthermore, the coupling device 201 can comprise a tongue and groove connection axially locking the seal 203 to the fluid guide device 301. For purposes of this application, axially locking means connecting such that a relative movement between parts in a direction of the central axis 205 of the coupling device 201 is inhibited, such as prevented. For example, as shown in FIG. 15, the coupling device can comprise the illustrated tongue and groove connection where a tongue 1501 of each of the segments 301a-f is seated within a groove 1503 within the interior concave surface 1107 of the seal 203. The tongue 1501 seated within the groove 1503 can axially lock the seal 203 to the fluid guide device 301 since relative movement between the seal 203 and fluid guide device 301 in a direction of the central axis 205 of the coupling device 201 is inhibited, such as prevented, by the tongue and groove connection. Although not shown, in further embodiments, the tongue and groove connection can include a tongue defined by the interior surface of the seal that is seated within a groove defined by each of the segments.

In some embodiments, the seal 203 can bias the plurality of segments 301a-f together in a constricted configuration.

For example, as shown in FIG. 15, the interior concave surface 1107 of the seal 203 can snuggly engage the outer convex surface 403 of the segments 301a-f such that the segments are held together with corresponding side edges of adjacent pairs of the segments 301a-f engaging one another. Although not shown, in some embodiments, the side edges of the adjacent pairs of segments 301a-f may be keyed into one another to facilitate proper alignment. For example, a tongue of one side edge of one segment may fit into a groove of an adjacent side edge of an adjacent segment to facilitate alignment while the seal 203 biases the segments together. In some embodiments, although not required, the seal 203 can be stretched over the plurality of segments 301a-f to radially constrict the segments together in a radially constricted orientation and force the side edges of the adjacent pairs of segments together while tension in the seal 203 facilitates maintenance of the segments in the radially constricted orientation.

Once the assembled, the circumferential guide flanges 401 of the segments 301a-f of the fluid guide device 301 can extend towards the central axis 205 and cooperate to circumscribe the central axis 205. In some embodiments, as shown, adjacent sides adjacent pairs of circumferential guide flanges 401 can abut one another in the constricted orientation to provide of the circumferential guide flanges 401 as a substantially continuous guide flange encircling the central axis 205.

As discussed below and illustrated by the fluid flow arrows shown in FIGS. 15-16, the fluid guide device 301 at least partially defines a fluid path extending through an area defined between the fluid guide device 301 and the interior concave surface 1107 of the seal 203. As shown in FIG. 14, the area can comprise the blind channels 405 that are capped by the interior concave surface 1107 of the seal 203 to define the fluid paths referenced by the arrows shown passing through the blind channels 405 in FIG. 16. As shown in FIG. 16, the blind channels 405 extend from the first axial end 407a to the second axial end 407b such that the fluid path can pass through the entire axial length "L1" and through the first and second axial ends 407a, 407b.

FIG. 15 illustrates the pipe apparatus 101 where the coupling device 201 couples the first end portion 1001a of the first pipe segment 103a to the second end portion 1001b of the second pipe segment 103b. Axial locking is achieved by axially locking the first end portion 1001a of the first pipe segment 103a to the fluid guide device 301 and axially locking the second end portion 1001b of the second pipe segment 103b to the fluid guide device 301. In some embodiments, axially locking can be achieved by tongue and groove connections where a first tongue and groove connection axially locks the first end portion 1001a to the fluid guide device 301 and a second tongue and groove connection axially locks the second end portion 1001b to the fluid guide device 301.

Each tongue and groove connection can comprise a tongue of one of the end portion of the pipe segment and the fluid guide device engaging a groove of another of the end portion of the pipe segment and the fluid guide device. In some embodiments, the fluid guide device comprises a groove configured to receive and engage a tongue of the end portion of the pipe segment. Alternatively, as shown FIG. 6, each segment 301a-f can be provided with a first tongue 601a and a second tongue 601b. Each first and second tongue 601a, 601b can comprise a ramped face 603a, 603b. The first ramped face 603a can ramp inwardly toward the central axis 205 in a direction from the first axial opening 1103a toward the second axial opening 1103b. The second ramped face 603b can ramp inwardly toward the central axis 205 in a direction from the second axial opening 1103b toward the first axial opening 1103a. As shown in FIG. 15, the first tongue 601a of each segment 301a-f can be engaged with a first groove 1505a of the first end portion 1001a of the first pipe segment 103a to axially lock the first pipe segment 103a to the coupling device 201. Likewise, the second tongue 601b of each segment 301a-f can be engaged with a second groove 1505b of the second end portion 1001b of the second pipe segment 103b to axially lock the second pipe segment 103b to the coupling device 201.

Figure 12:
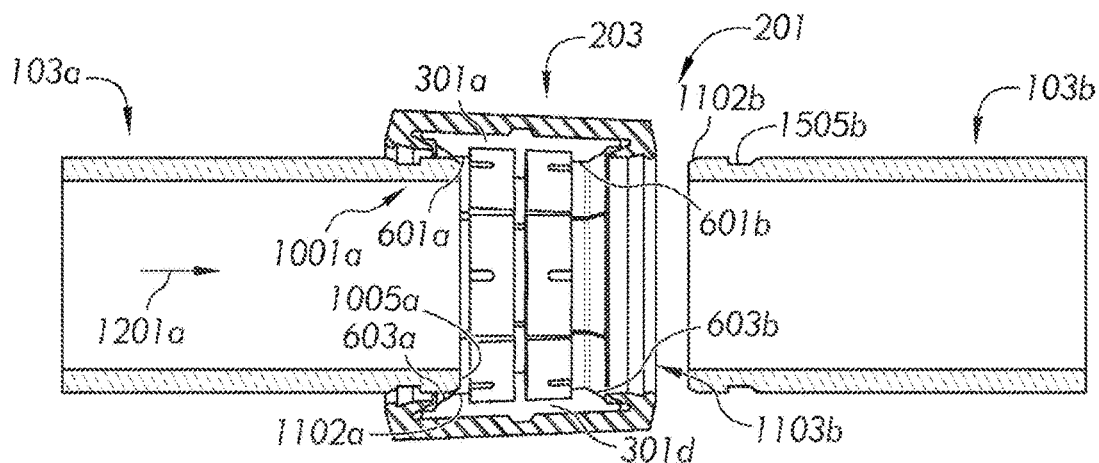
Figure 13:
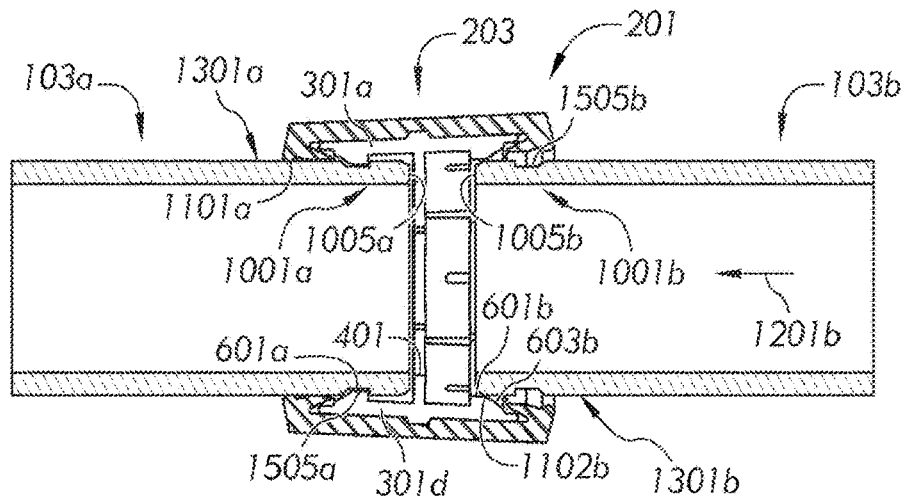

A method of assembling a pipe apparatus 101 comprising the coupling device 201 described above will now be discussed with reference to FIGS. 11-13. As shown in FIG. 11, the first pipe segment 103a can be aligned with the first axial opening 1103a. As shown in FIG. 12, the first outer circumferential edge 1005a of the first end portion 1001a of the first pipe segment 103a can be inserted into the first axial opening 1103a of the seal 203 in the first inward axial direction 1201a. The step of inserting the first outer circumferential edge 1005a through into the first axial opening 1103a results in the first circumferential flange 1101a sealing against an outer peripheral surface 1301a of the first end portion 1001a. The method further comprises axially locking the first end portion 1001a of the first pipe segment 103a to the fluid guide device 301. For example, as shown in FIG. 12, an outer portion 1102a of the first outer circumferential edge 1005a (e.g., the illustrated chamfered portion) may engage the ramped face 603a of the first tongue 601a wherein further inserting of the first outer circumferential edge 1005a of the first end portion 1001a of the first pipe segment 103a into the first axial opening 1103a of the seal 203 dilates a first corresponding axial end of the plurality of segments 301a-f of the fluid guide device 301 against a bias of the seal 203. Upon full insertion, as shown in FIG. 13, the first tongue 601a drops into the first groove 1505a by the seal 203 constricting the first corresponding axial end of the plurality of segments 301a-f of the fluid guide device 301 to axially lock the first end portion 1001a of the first pipe segment 103a to the fluid guide device 301. Once axially locked, the seal 203 can bias the first tongues 601a to remain in the first groove 1505a to maintain the axially locked connection. Once axially locked, as shown in FIG. 15, a first gap 1507a is maintained between the first outer circumferential edge 1005a and the circumferential guide flanges 401.

As shown in FIG. 12, the second pipe segment 103b can be aligned with the second axial opening 1103b. As shown in FIG. 13, the second outer circumferential edge 1005b of the second end portion 1001b of the second pipe segment 103b can be inserted into the second axial opening 1103b of the seal 203 in the second inward axial direction 1201b. The step of inserting the second outer circumferential edge 1005b through into the second axial opening 1103b results in the second circumferential flange 1101b sealing against an outer peripheral surface 1301b of the second end portion 1001b as shown in FIG. 15. The method further comprises axially locking the second end portion 1001b of the second pipe segment 103b to the fluid guide device 301. For example, as shown in FIG. 13, an outer portion 1102b of the second outer circumferential edge 1005b (e.g., the illustrated chamfered portion) may engage the ramped face 603b of the second tongue 601b wherein further inserting of the second outer circumferential edge 1005b of the second end portion 1001b of the second pipe segment 103b into the second axial opening 1103b of the seal 203 dilates a second corresponding axial end of the plurality of segments 301a-f of the fluid guide device 301 against a bias of the seal 203. Upon full insertion, as shown in FIG. 15, the second tongue 601b drops into the second groove 1505b by the seal 203 constricting the second corresponding axial end of the plurality of segments 301a-f of the fluid guide device 301 to axially lock the second end portion 1001b of the second pipe segment 103b to the fluid guide device 301. Once axially locked, the seal 203 can bias the second tongues 601b to remain in the second groove 1505b to maintain the axially locked connection. Once axially locked, as shown in FIG. 15, a second gap 1507b is maintained between the second outer circumferential edge 1005b and the circumferential guide flanges 401.

Thus, once the first and second end portions 1001a, 1001b are axially locked relative to one another by the coupling device, the circumferential gap 1007 can be maintained between the first outer circumferential edge 1005a and the second outer circumferential edge 1005b. Furthermore, the circumferential guide flanges 401 of the segments 301a-f of the fluid guide device 301 can extend into the circumferential gap 1007. In some embodiments, the circumferential guide flanges 401 can extend over a part or the entire first and second outer circumferential edges 1005a, 1005b. In the illustrated embodiment, the circumferential guide flanges 401 extend over the entire first and second outer circumferential edges 1005a, 1005b and over the outer circumferential edges such that the tips of the circumferential guide flanges 401 extend within the footprint of the inner diameter of the pipe segments as shown in FIG. 14.

FIGS. 7-10 illustrate another method of assembling a pipe apparatus 101. As shown in FIG. 7, the first outer circumferential edge 1005a of the first pipe segment 103a can be inserted through the interior of the seal 203. Once fully inserted, the first circumferential flange 1101a and the second circumferential flange 1101b seal against the outer peripheral surface 1301a of the first pipe segment 103a to define the first circumferential pocket 1105 (see FIG. 9) between the interior concave surface 1107 and the outer peripheral surface 1301a of the first pipe segment 103a. Then the first and second pipe segments 103a, 103b can be coaxially aligned with the first outer circumferential edge 1005a of the first pipe segment 103a being spaced from the second outer circumferential edge 1005b of the second pipe segment 103b to form the circumferential gap 1007 with the gap width 701.

Figure 8:
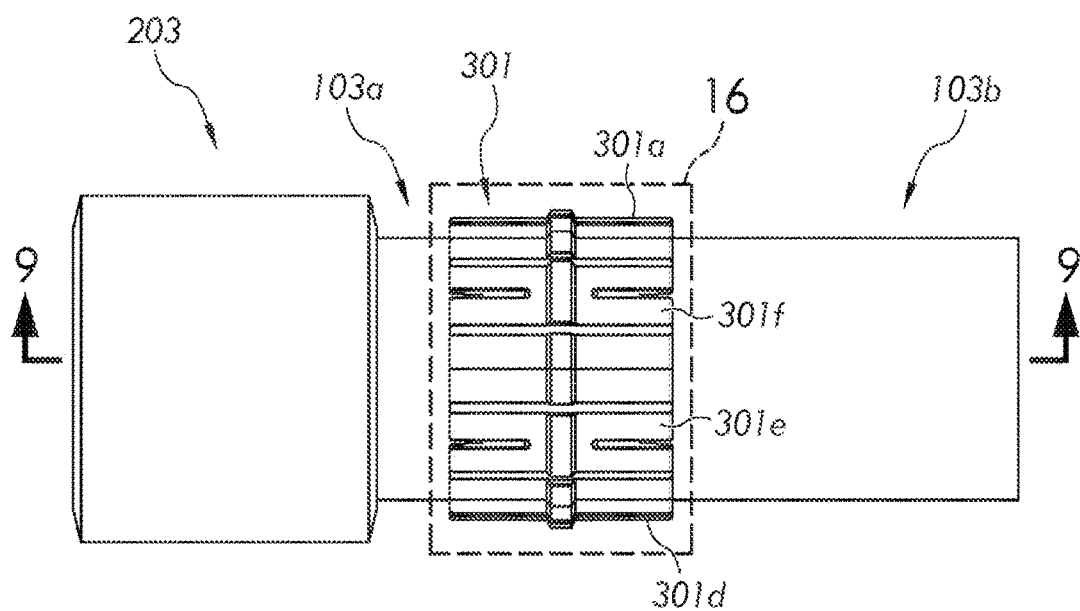
Figure 9:
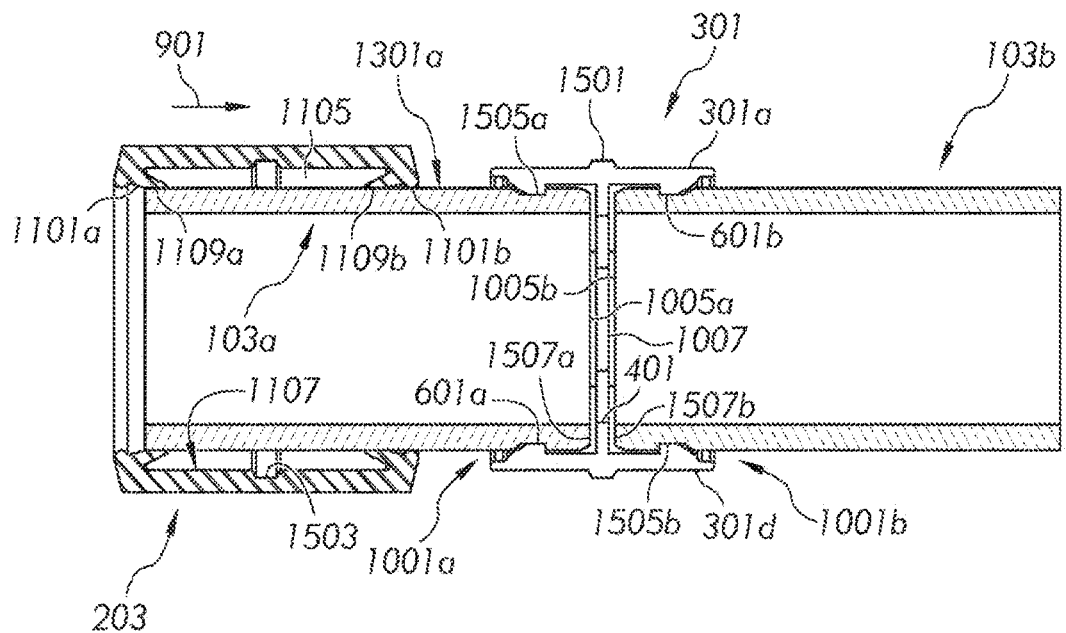
FIG. 9 is a cross-section of the pipe apparatus along line 9-9 of FIG. 8.

As shown in FIG. 8, the segments 301a-f of the fluid guide device 301 can be radially arranged around the first end portion 1001a of the first pipe segment 103a and the second end portion 1001b of the second pipe segment 103b. Once radially positioned, as shown in FIG. 9, the first tongue 601a of each of the segments 301a-f are received in the first groove 1505a of the first end portion 1001a of the first pipe segment 103a. Likewise, once radially positioned, as shown in FIG. 9, the second tongue 601b of each of the segments 301a-f are received in the second groove 1505b of the second end portion 1001b of the second pipe segment 103b. As shown in FIG. 10, the seal 203 can then be moved relative to the fluid guide device 301 in the direction of arrow 901 until the fluid guide device 301 is seated within the first circumferential pocket 1105. Once in place, as shown in FIG. 10, the seal 203 can bias the segments 301a-f into the illustrated constricted orientation wherein the first and second pipe segments 103a, 103b are locked relative to one another by way of the coupling device 201.

Once the pipe apparatus 101 is assembled (e.g., by the method illustrated in FIGS. 7-10 or the method illustrated in FIGS. 11-13), the seal 203 can circumscribe the circumferential gap 1007 (see FIG. 10). As further illustrated in FIG. 15, the first circumferential flange 1101a can engage and seal against the outer peripheral surface 1301a of the first end portion 1001a of the first pipe segment 103a. Furthermore, the second circumferential flange 1101b can engage and seal against the outer peripheral surface 1301b of the second end portion 1001b of the second pipe segment 103b. The first circumferential pocket 1105 can be defined between the interior concave surface 1107 of the seal 203, the outer peripheral surface 1301a of the first end portion 1001a of the first pipe segment 103a and the outer peripheral surface 1301b of the second end portion 1001b of the second pipe segment 103b. The fluid guide device 301 can be positioned at least partially within the first circumferential pocket 1105 with the plurality of segments 301a-f radially arranged to circumscribe the first end portion 1001a of the first pipe segment 103a and the second end portion 1001b of the second pipe segment 103b. The fluid guide device 301 can further comprise a first axial end positioned over the first end portion 1001a and a second axial end positioned over the second end portion 1001b wherein the fluid guide device 301 at least partially defines a fluid path extending from the circumferential gap 1007 through the area (e.g., the blind channels 405) defined between the fluid guide device 301 and the interior concave surface 1107 of the seal 203.

Furthermore, once the pipe apparatus 101 is assembled, the circumferential guide flanges 401 of the fluid guide device 301 can each extend at least partially into the circumferential gap 1007 between the first outer circumferential edge 1005a and the second outer circumferential edge 1005b, wherein an axial width 1509 (see FIG. 15) of the circumferential guide flange 401 is less than the axial gap width 701 of the circumferential gap 1007. The differences in width can provide that the circumferential guide flange 401 is spaced from the first outer circumferential edge 1005a to define the first gap 1507a therebetween. Furthermore, the differences in width can provide that the circumferential guide flange 401 is spaced from the second outer circumferential edge 1005b to define the second gap 1507b therebetween. Maintenance of the first and second gaps 1507a, 1507b can be provided by the first tongue and groove connection (e.g., 601a, 1505a) axially locking the fluid guide device 301 to the first end portion 1001a and the second tongue and groove connection (e.g., 601b, 1505b) axially locking the fluid guide device 301 to the second end portion 1001b.

Methods of using the pipe apparatus is illustrated in FIGS. 15-16. The methods can comprise passing an upstream quantity of fluid 1511 through an interior of the first pipe segment 103a in a first axial direction of the first pipe segment 103a. The method can further comprise passing a first portion 1513a of the first upstream quantity of fluid 1511 through an interior of the second pipe segment 103b in a second axial direction of the second pipe segment 103b.

The methods can further comprise cooling the seal 203 by passing a second portion 1513b of the first upstream quantity of fluid 1511 through the area defined between the fluid guide device 301 and the interior concave surface 1107 of the seal 203. For example, the first gap 1507a can define a fluid inlet port of a fluid path extending from the fluid inlet port to the first through channel 409a of the fluid guide device 301. The second portion 1513b of the first upstream quantity of fluid 1511 can pass through the fluid inlet port and into the first through channel 409a. The second portion 1513b of the first upstream quantity of fluid 1511 can then pass through the first axial end 407a of the fluid guide device and into a first end portion 1105a of the first circumferential pocket 1105. As shown in FIG. 16, the second portion 1513b of the first upstream quantity of fluid 1511 can then be redirected from the first end portion 1105*a* of the first circumferential pocket 1105 to pass into the blind channel 405 from the first axial end 407*a* to the second axial end 407*b* wherein heat is transferred by convection from the seal 203 to the second portion 1513*b* of the first upstream quantity of fluid 1511. The fluid then exits the blind channel 405 into a second end portion 1105*b* of the first circumferential pocket 1105. The second portion 1513*b* of the first upstream quantity of fluid 1511 is then redirected to pass back through the second through channel 409*b* and out the second gap 1507*b* acting as the fluid outlet port. After passing through the fluid outlet port, the second portion 1513*b* of the first upstream quantity of fluid 1511 is combined with the first portion 1513*a* of the first upstream quantity of fluid 1511 into a second downstream quantity of fluid 1515 that passes through the interior of the second pipe segment 103*b* in the axial direction of the second pipe segment 103*b*.

Thus, the coupling device 201 can comprise a mechanical coupling that can quickly attach the end portions of pipe segments. The structural integrity of the seal can be maintained in high temperature environments since a portion of the fluid traveling through the pipe segments can be redirected to cool the seal that may otherwise degrade and fail under excessively high temperature conditions. In some embodiments, the second portion 1513*b* of the first upstream quantity of fluid 1511 can be driven through the area (e.g., the blind channels 405) with a pressure drop. For instance, a pressure drop can be provided between the fluid inlet port and the fluid outlet port to drive the second portion 1513*b* of the first upstream quantity of fluid 1511 through the area.

The circumferential guide flange 401 can help redirect the portion of the fluid traveling through the pipe segments to achieve the desired convective fluid flow through the area between the seal 203 and the fluid guide device 301. In some embodiments, the area between the seal 203 and the fluid guide device 301 can comprise the blind channel 405 capped by the interior concave surface 1107 of the seal 203. Furthermore, as shown in FIG. 14, in some embodiments, the tips of the circumferential guide flanges 401 can extend within the footprint of the inner diameter of the pipe segments. Such extension of the circumferential guide flanges 401 into the footprint of the inner diameter can help generate a pressure drop between the fluid inlet port and the fluid outlet port that can help drive the second portion 1513*b* of the first upstream quantity of fluid 1511 to provide a convective flow of fluid through the blind channels 405 to transfer heat from the seal 203 to the fluid flowing through blind channels 405.

Figure 17:
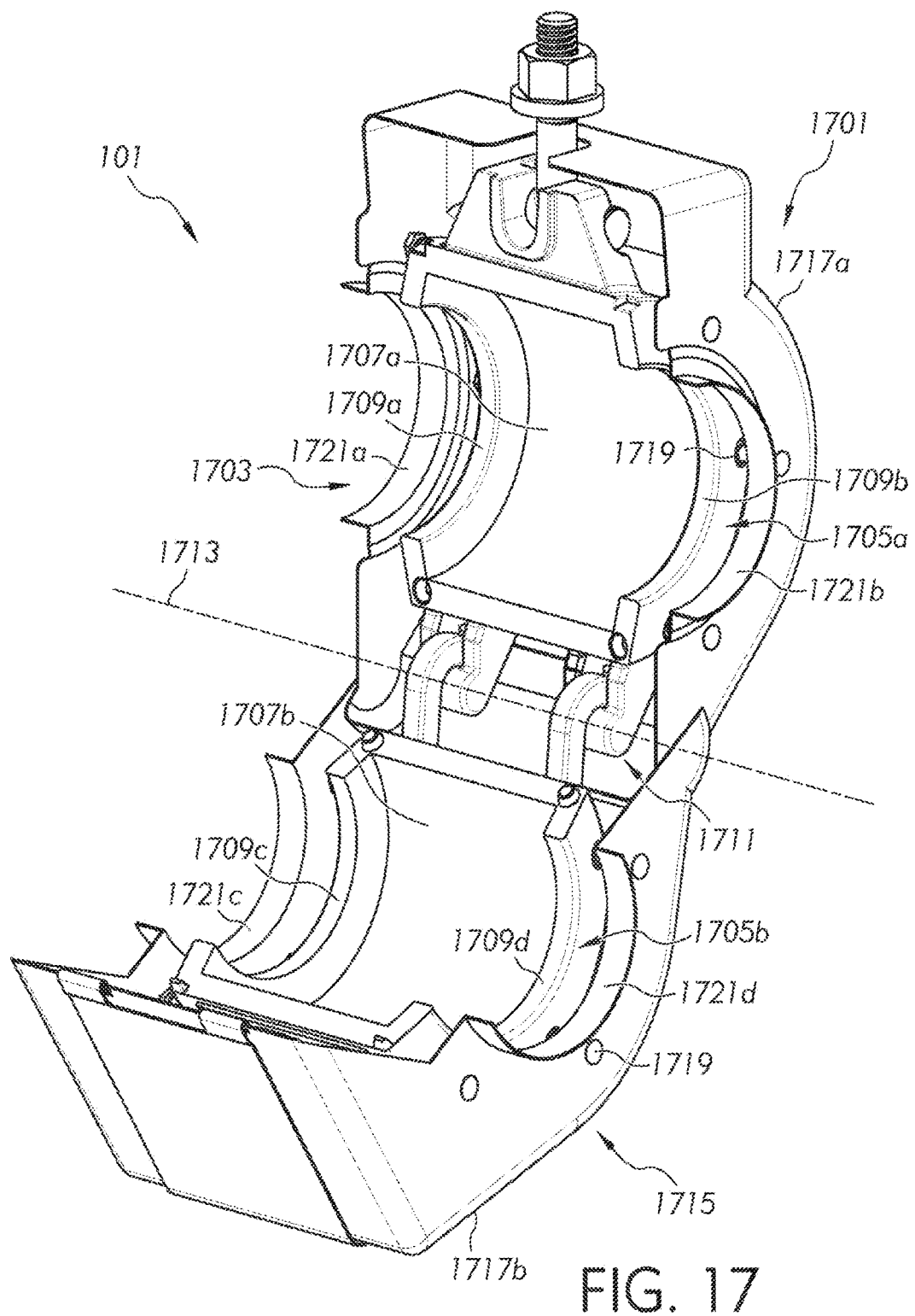
FIGS. 17-19 illustrate steps in assembling an insulating device with the pipe apparatus shown in FIG. 2 to provide the pipe apparatus shown in FIG. 1.

FIG. 17 illustrates another embodiment of a pipe apparatus 101 that may comprise a protective shroud 1701. In some embodiments, the pipe apparatus 101 can comprise only the protective shroud 1701. In further embodiments, the pipe apparatus 101 can comprise the protective shroud 1701 in combination with the coupling device 201 attaching the first pipe segment 103*a* and the second pipe segment 103*b* together as shown in FIG. 1.

The protective shroud 1701 can further help insulate the seal 203 to reduce heat transfer to the seal 203 from the surrounding environment. For instance, the protective shroud 1701 can comprise housing 1703 with a first housing half 1705*a* defining a first cavity 1707*a* and a second housing half 1705*b* comprising a second cavity 1707*b*. The first housing half 1705*a* can comprise a first reception area 1709*a* and a second reception area 1709*b* that are axially aligned with the first cavity 1707*a* positioned therebetween.

The second housing half 1705*b* can comprise a third reception area 1709*c* and a fourth reception area 1709*d*. In some embodiments, the reception areas 1709*a*-*d* can comprise a shape that follows the outer peripheral surfaces 1301*a*, 1301*b* of the pipe segments 103*a*, 103*b*. For example, as illustrated the reception areas 1709*a*-*d* can each comprise a semicircular concave portion. Furthermore, the first cavity 1707*a* of the first housing half 1705*a* and the second cavity 1707*b* of the second housing half 1705*b* can also comprise a shape (e.g., semicircular concave portion) that follows the outer peripheral surface 204 of the seal 203. The housing halves can be pivotably connected at hinge 1711 such that the second housing half 1705*b* may pivot relative to the first housing half 1705*a* about a shroud axis 1713. The housing can be fabricated from a wide range of materials such as steel or other metal. In further embodiments, the housing can be fabricated from an insulative material such as a high-temperature plastic or ceramic that can withstand the heat from the surrounding environment while including insulative properties that help resist heat conducting through the housing wall.

In some embodiments, the protective shroud 1701 can further include a heat shield 1715. The heat shield 1715 can comprise a first portion 1717*a* mounted to the first housing half 1705*a* by stand-off pegs 1719 such that the first portion 1717*a* surrounds an outer surface area of the first housing half 1705*a* while being spaced from the outer surface area of the first housing half 1705*a*. Likewise, the heat shield 1715 can comprise a second portion 1717*b* mounted to the second housing half 1705*b* by stand-off pegs 1719 such that the second portion 1717*b* surrounds an outer surface area of the second housing half 1705*b* while being spaced from the outer surface area of the second housing half 1705*b*. The first portion 1717*a* of the heat shield 1715 can comprise a fifth reception area 1721*a* and a sixth reception area 1721*b* that are axially aligned and the second portion 1717*b* of the heat shield 1715 can comprise a seventh reception area 1721*c* and an eighth reception area 1721*d* that are axially aligned. In some embodiments, the reception areas 1721*a*-*d* can comprise a shape that follows the outer peripheral surfaces 1301*a*, 1301*b* of the pipe segments 103*a*, 103*b*. For example, as illustrated the reception areas 1721*a*-*d* can each comprise a semicircular concave portion.

Figure 18:
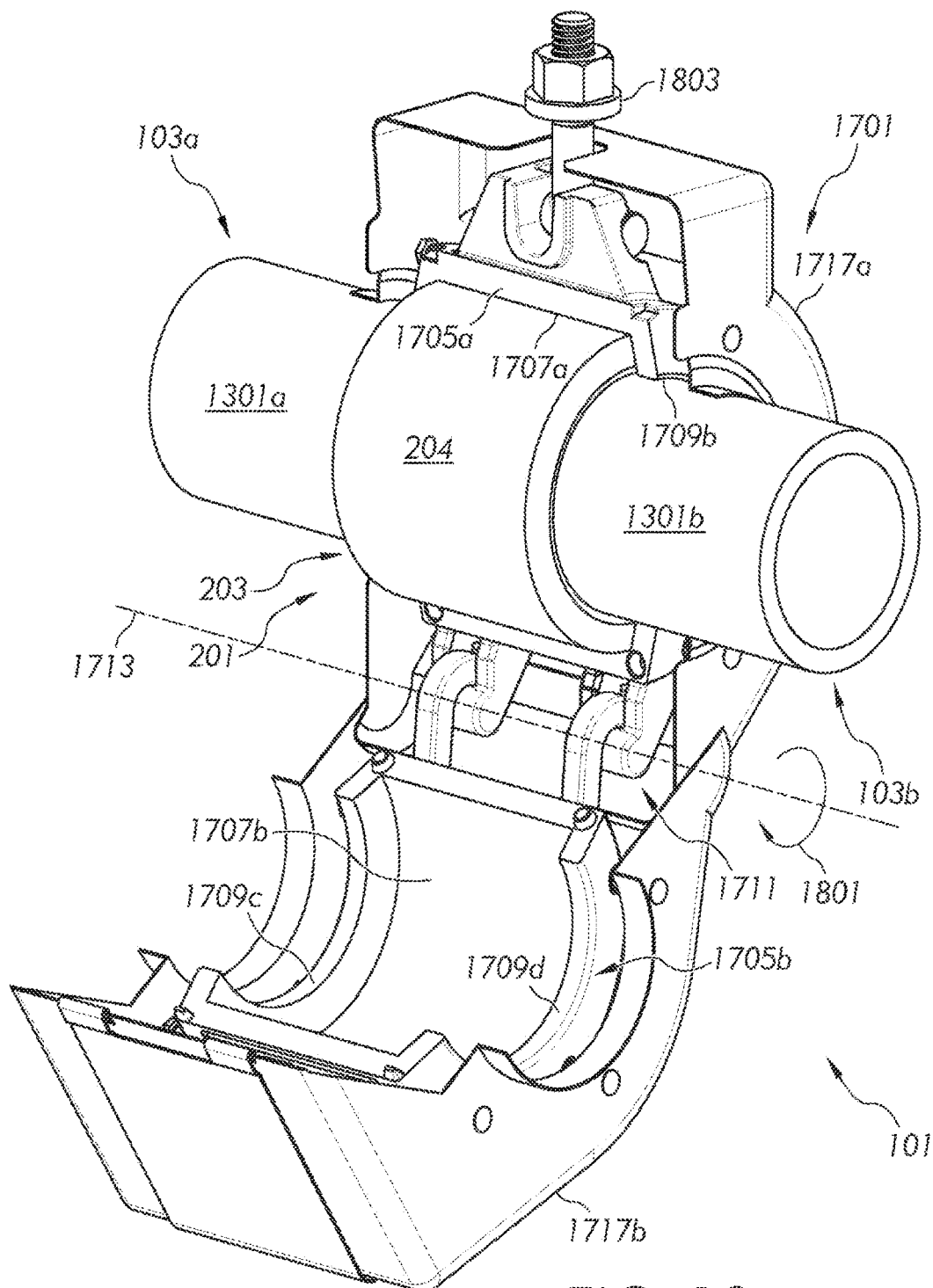
Figure 19:
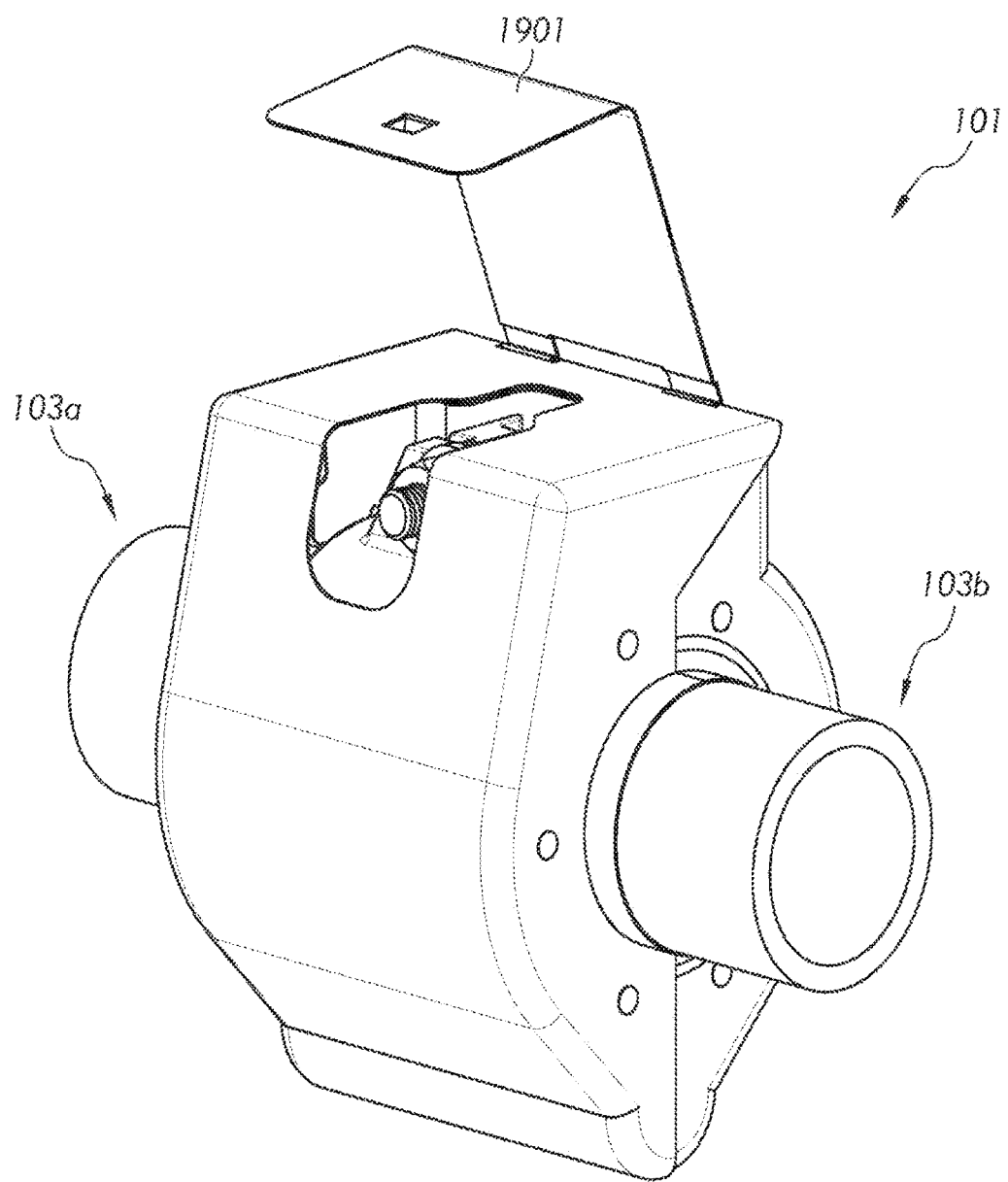
Figure 20:
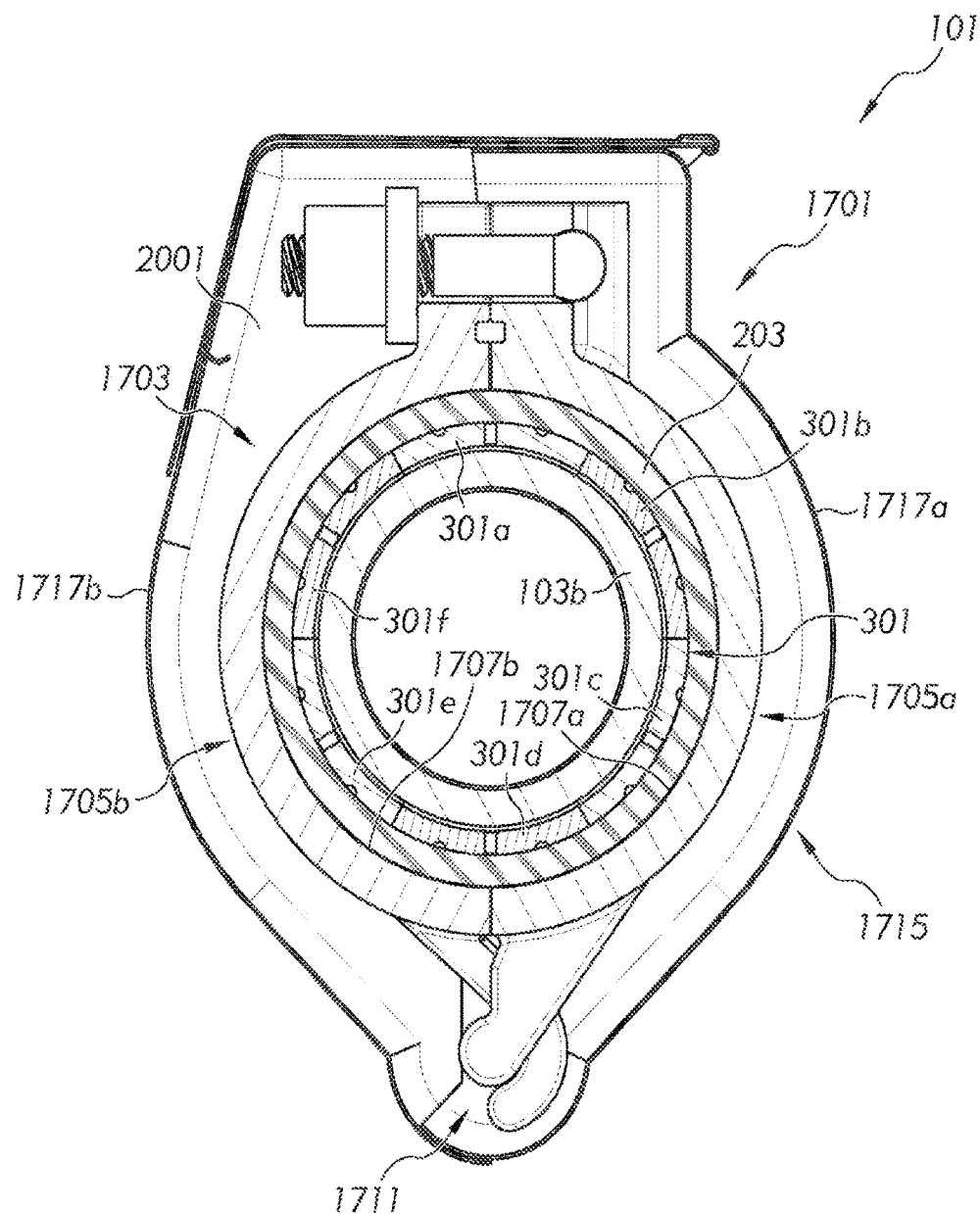
FIG. 20 is a cross-section of the pipe apparatus along line 20-20 of FIG. 1.

Methods of mounting the coupling device 201 within the protective shroud 1701 is illustrated with respect to FIGS. 18-20. As shown in FIG. 18, the coupling device 201 can be positioned within the first cavity 1707*a* of the first housing half 1705*a*. As shown, the interior surface of the first cavity 1707*a* can closely follow and contact the outer peripheral surface 204 of the seal 203, the inner surface defining the first reception area 1709*a* can closely follow and contact the outer peripheral surface 1301*a* of the first pipe segment 103*a*, and the inner surface defining the second reception area 1709*b* can closely follow and contact the outer peripheral surface 1301*b* of the second pipe segment 103*b*. Furthermore, the inner surface defining the fifth reception area 1721*a* can closely follow and contact the outer peripheral surface 1301*a* of the first pipe segment 103*a*, and the inner surface defining the sixth reception area 1721*b* can closely follow and contact the outer peripheral surface 1301*b* of the second pipe segment 103*b*.

As shown in FIG. 18, the second housing half 1705*b* together with the attached second portion 1717*b* of the heat shield 1715 can be pivoted about the shroud axis 1713 in the direction 1801 from the open orientation (see FIG. 18) to the closed orientation (see FIG. 19). A pivot bolt 1803 can then be pivoted down to lock the first and second housing halves 1705a, 1705b in the closed orientation shown in FIGS. 19-20. Once locked, the access panel 1901 can be pivoted from the open orientation shown in FIG. 20 to the closed orientation shown in FIG. 1. Pivoting the access panel 1901 can close the access opening used when pivoting the pivot bolt 1803 and locking the first and second housing halves 1705a, 1705b in the closed orientation. Once the first and second housing halves 1705a, 1705b are locked in the closed orientation, the coupling device 201 can be positioned within the second cavity 1707b of the second housing half 1705b. The interior surface of the second cavity 1707b can closely follow and contact the outer peripheral surface 204 of the seal 203, the inner surface defining the third reception area 1709c can closely follow and contact the outer peripheral surface 1301a of the first pipe segment 103a, and the inner surface defining the fourth reception area 1709d can closely follow and contact the outer peripheral surface 1301b of the second pipe segment 103b. Furthermore, the inner surface defining the seventh reception area 1721c can closely follow and contact the outer peripheral surface 1301a of the first pipe segment 103a, and the inner surface defining the eighth reception area 1721d can closely follow and contact the outer peripheral surface 1301b of the second pipe segment 103b.

Referring to FIG. 20, once the first and second housing halves 1705a, 1705b are locked in the closed orientation, the first cavity 1707a of the first housing half 1705a cooperates with the second cavity 1707b of the second housing half 1705b to form a second circumferential pocket with the seal 203 positioned within the second circumferential pocket. Furthermore, once the first and second housing halves 1705a, 1705b are locked in the closed orientation, the first portion 1717a of the heat shield 1715 and the second portion 1717b of the heat shield cooperate to circumscribe the housing 1703 to define a chamber 2001 between the heat shield 1715 and the housing 1703.

In operation the heat shield can provide trapped air in the chamber 2001 between the heat shield 1715 and the housing 1703 that acts as insulation to resist heat transferring from the heat shield to the housing 1703. Furthermore, the housing 1703 can comprise a heat insulating material (e.g., ceramic) that can act to reduce heat transferring from the chamber to the seal 203. Still further, the coupling device 201 can provide fluid cooling of the seal 203 in use. In accordance to features of the disclosure, the pipe apparatus 101 can provide mechanical coupling of pipe segments in a high-temperature environment. The mechanical coupling reduces the costs of assembling a network of pipe segments in a desired configuration. Furthermore, the mechanical coupling facilitates maintenance by allowing removal and replacement of components of the coupling device 201, first pipe segment 103a, or second pipe segment 103b without destroying the pipe segments that may otherwise occur with techniques that permanently connect pipe segments together. Furthermore, the fluid cooled features of the coupling device 201 can facilitate heat transfer away from the seal to avoid failure and the protective shroud 1701 can further reduce heat transferring from a high temperature environment (e.g., a building on fire) to the seal 203.

What is claimed is:

1. A pipe apparatus comprising:
   a first pipe segment comprising a first end portion comprising a first outer circumferential edge;
   a second pipe segment comprising a second end portion comprising a second outer circumferential edge facing the first outer circumferential edge, and the first outer circumferential edge is spaced from the second outer circumferential edge to define a circumferential gap between the first outer circumferential edge and the second outer circumferential edge;
   a seal circumscribing the circumferential gap, the seal comprising a first circumferential flange engaging the first end portion of the first pipe segment and a second circumferential flange engaging the second end portion of the second pipe segment;
   a first circumferential pocket defined between an interior surface of the seal, the first end portion, and the second end portion; and
   a fluid guide device positioned at least partially within the first circumferential pocket, the fluid guide device comprising a plurality of segments that are radially arranged to circumscribe the first end portion and the second end portion, the fluid guide device further comprising a first axial end positioned over the first end portion and a second axial end positioned over the second end portion, and the fluid guide device at least partially defining a fluid path extending from an inlet port at the circumferential gap, through a channel defined between the fluid guide device and the interior surface of the seal, to an outlet port at the circumferential gap,
   wherein the pipe apparatus is configured to pass a quantity of fluid from an interior of the first pipe segment through the fluid inlet port into the channel, through the channel to the fluid outlet port, and through the fluid outlet port to an interior of the second pipe segment.

2. The pipe apparatus of claim 1, wherein the fluid guide device comprises a circumferential guide flange extending at least partially into the circumferential gap between the first outer circumferential edge and the second outer circumferential edge, wherein an axial width of the circumferential guide flange is less than an axial width of the circumferential gap.

3. The pipe apparatus of claim 2, wherein the circumferential guide flange is spaced from the first outer circumferential edge and the second outer circumferential edge.

4. The pipe apparatus of claim 1, further comprising a first tongue and groove connection axially locking the fluid guide device to the first end portion and a second tongue and groove connection axially locking the fluid guide device to the second end portion.

5. The pipe apparatus of claim 1, further comprising a third tongue and groove connection axially locking the seal to the fluid guide device.

6. The pipe apparatus of claim 1, wherein the channel is defined between an outer convex surface of the fluid guide device and the interior surface of the seal.

7. The pipe apparatus of claim 1, wherein the seal biases the plurality of segments together in a constricted configuration.

8. The pipe apparatus of claim 1, wherein the channel extends from a first axial end of the fluid guide device to a second axial end of the fluid guide device.

9. The pipe apparatus of claim 1, further comprising a housing comprising a second circumferential pocket, wherein the seal is positioned within the second circumferential pocket.

10. The pipe apparatus of claim 9, further comprising a heat shield at least partially circumscribing the housing, the heat shield spaced from the housing to define a chamber between the heat shield and the housing.

11. A method of using the pipe apparatus of claim 1 comprising:

passing an upstream quantity of fluid through an interior of the first pipe segment in a first axial direction of the first pipe segment;

passing a first portion of the first upstream quantity of fluid through an interior of the second pipe segment in a second axial direction of the second pipe segment;

cooling the seal by passing a second portion of the first upstream quantity of fluid through the fluid inlet port, then through the channel, and then through the fluid outlet port; and then passing the second portion of the first upstream quantity of fluid through the interior of the second pipe segment.

12. The method of claim 11, further comprising driving the second portion of the first upstream quantity of fluid through the channel with a pressure drop.

13. A pipe apparatus comprising:
a first pipe segment comprising a first end portion comprising a first outer circumferential edge;
a second pipe segment comprising a second end portion comprising a second outer circumferential edge facing the first outer circumferential edge, and the first outer circumferential edge is spaced from the second outer circumferential edge to define a circumferential gap between the first outer circumferential edge and the second outer circumferential edge;
a seal circumscribing the circumferential gap, the seal comprising a first circumferential flange engaging the first end portion of the first pipe segment and a second circumferential flange engaging the second end portion of the second pipe segment;
a first circumferential pocket defined between an interior surface of the seal, the first end portion, and the second end portion; and
a fluid guide device positioned at least partially within the first circumferential pocket, the fluid guide device comprising a circumferential guide flange extending at least partially into the circumferential gap between the first outer circumferential edge and the second outer circumferential edge, wherein an axial width of the circumferential guide flange is less than an axial width of the circumferential gap, the circumferential guide flange is spaced from the first outer circumferential edge to define a fluid inlet port, and the circumferential guide flange is spaced from the second outer circumferential edge to define a fluid outlet port, wherein the fluid guide device at least partially defines a fluid path extending from the fluid inlet port through a channel defined between the fluid guide device and the interior surface of the seal, and from the channel to the fluid outlet port,
wherein the pipe apparatus is configured to pass a quantity of fluid from an interior of the first pipe segment through the fluid inlet port into the channel, through the channel to the fluid outlet port, and through the fluid outlet port to an interior of the second pipe segment.

14. A method of using the pipe apparatus of claim 13 comprising:
passing an upstream quantity of fluid through an interior of the first pipe segment in a first axial direction of the first pipe segment;
passing a first portion of the first upstream quantity of fluid through an interior of the second pipe segment in a second axial direction of the second pipe segment;
passing a second portion of the first upstream quantity of fluid through the fluid inlet port, then through the channel to cool the seal, and then through the fluid outlet port; and then
passing the second portion of the first upstream quantity of fluid through the interior of the second pipe segment.

15. The method of claim 14, further comprising driving the second portion of the first upstream quantity of fluid through the channel with a pressure drop between the fluid inlet port and the fluid outlet port.

16. A coupling device comprising:
a seal circumscribing a central axis of the coupling device, the seal comprising a first circumferential flange extending toward the central axis and a second circumferential flange extending toward the central axis;
a first circumferential pocket at least partially defined by an interior surface of the seal, the first circumferential flange, and the second circumferential flange; and
a fluid guide device positioned at least partially within the first circumferential pocket, the fluid guide device comprises a plurality of segments that are radially arranged to circumscribe the central axis, each segment of the plurality of segments comprising an arcuate wall comprising an inner concave surface and an outer convex surface, and each segment at least partially defining a fluid path extending through a channel defined between the outer convex surface and the interior surface of the seal.

17. The coupling device of claim 16, wherein the seal biases the plurality of segments together in a constricted configuration.

18. The coupling device of claim 16, wherein the fluid guide device comprises a circumferential guide flange extending toward the central axis and circumscribing the central axis.

19. The coupling device of claim 16, further comprising a tongue and groove connection axially locking the seal to the fluid guide device.

20. The coupling device of claim 16, wherein the channel extends from a first axial end of the fluid guide device to a second axial end of the fluid guide device.

21. A method of assembling a pipe apparatus comprising the coupling device of claim 16 comprising:
inserting a first outer circumferential edge of a first end portion of a first pipe segment into a first axial opening of the seal, wherein the first circumferential flange seals against an outer peripheral surface of the first end portion;
axially locking the first end portion of the first pipe segment to the fluid guide device;
inserting a second outer circumferential edge of a second end portion of a second pipe segment into a second axial opening of the seal, wherein the second circumferential flange seals against an outer peripheral surface of the second end portion; and
axially locking the second end portion of the second pipe segment to the fluid guide device, wherein the first outer circumferential edge faces the second outer circumferential edge and a gap is maintained between the first outer circumferential edge and the second outer circumferential edge.

22. The method of claim 21, wherein a circumferential guide flange of the fluid guide device extends into the gap.

23. The method of claim 22, wherein the circumferential guide flange is spaced from the first outer circumferential edge and the second outer circumferential edge.

24. The method of claim 21, wherein the axially locking the first end portion of the first pipe segment to the fluid guide device comprises engaging a tongue of one of the first end portion or the fluid guide device with a groove of another of the first end portion or the fluid guide device.

25. The method of claim 24, wherein the axially locking the second end portion of the first pipe segment to the fluid guide device comprises engaging a tongue of one of the second end portion or the fluid guide device with a groove of another of the first end portion or the fluid guide device.

26. The method of claim 21, wherein the inserting the first outer circumferential edge of the first end portion of the first pipe segment into the first axial opening of the seal dilates a first corresponding axial end of the plurality of segments of the fluid guide device against a bias of the seal.

27. The method of claim 26, wherein the axially locking the first end portion to the fluid guide device comprises constricting the first corresponding axial end of the plurality of segments of the fluid guide device.

28. The method of claim 21, wherein the inserting the second outer circumferential edge of the second end portion of the second pipe segment into the second axial opening of the seal-dilates a corresponding second axial end of the plurality of segments of the fluid guide device against a bias of the seal.

29. The method of claim 28, wherein the axially locking the second end portion to the fluid guide device comprises constricting the corresponding second axial end of the plurality of segments of the fluid guide device.

* * * * *